(12) United States Patent
Morimura

(10) Patent No.: US 10,913,392 B2
(45) Date of Patent: Feb. 9, 2021

(54) WARNING DEVICE

(71) Applicant: TOYOTA JIDOSHA KABUSHIKI KAISHA, Toyota (JP)

(72) Inventor: Junichi Morimura, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 328 days.

(21) Appl. No.: 15/950,842

(22) Filed: Apr. 11, 2018

(65) Prior Publication Data
US 2018/0297520 A1 Oct. 18, 2018

(30) Foreign Application Priority Data

Apr. 12, 2017 (JP) .................................. 2017-079170

(51) Int. Cl.
*B60Q 9/00* (2006.01)
*G06K 9/00* (2006.01)
*G02B 27/01* (2006.01)
*B60W 50/14* (2020.01)

(52) U.S. Cl.
CPC ............. *B60Q 9/008* (2013.01); *B60W 50/14* (2013.01); *G02B 27/0101* (2013.01); *G06K 9/00805* (2013.01); *B60W 2050/146* (2013.01); *G02B 2027/0141* (2013.01); *G06K 9/00369* (2013.01)

(58) Field of Classification Search
CPC ....................................................... B60Q 9/008
See application file for complete search history.

(56) References Cited

U.S. PATENT DOCUMENTS

| 7,729,858 | B2 | 6/2010 | Koike et al. | |
| 8,035,493 | B2* | 10/2011 | Hioki | B60K 35/00 |
| | | | | 340/425.5 |
| 8,503,729 | B2 | 8/2013 | Kumagai | |
| 8,854,197 | B2* | 10/2014 | Ikeda | G08G 1/165 |
| | | | | 340/425.5 |
| 9,021,384 | B1* | 4/2015 | Beard | G06F 16/248 |
| | | | | 715/781 |

(Continued)

FOREIGN PATENT DOCUMENTS

| JP | H07061257 A | 3/1995 |
| JP | H08169288 A | 7/1996 |

(Continued)

OTHER PUBLICATIONS

U.S. Appl. No. 15/837,490, filed Dec. 11, 2017, 96 pages.

(Continued)

*Primary Examiner* — Michael A Berns
(74) *Attorney, Agent, or Firm* — Hunton Andrews Kurth LLP

(57) ABSTRACT

A warning device selects, as a first candidate, an obstacle whose collision time period is equal to or shorter than a threshold time period and is the shortest among at least one obstacle which is present either in a front area or in a side area. The warning device selects, as a second candidate, the obstacle whose collision time period is equal to or shorter than a threshold time period and is the shortest among at least one obstacle which is present in the side area. The warning device displays a warning screen which guides driver's eyes to a direction of one candidate with the shortest collision time period from the first candidate and the second candidate.

6 Claims, 8 Drawing Sheets

(56) References Cited

U.S. PATENT DOCUMENTS

| | | | |
|---|---|---|---|
| 9,073,484 B2* | 7/2015 | Aimura | G01C 21/3602 |
| 9,678,915 B2* | 6/2017 | Miura | G06F 13/4295 |
| 9,886,636 B2* | 2/2018 | Zhang | B60R 11/04 |
| 10,220,778 B2* | 3/2019 | Tomioka | B60Q 9/008 |
| 10,387,734 B2* | 8/2019 | Yamamoto | G08G 1/167 |
| 10,589,673 B2* | 3/2020 | Morimura | G06K 9/00362 |
| 2009/0140845 A1 | 6/2009 | Hioki | |
| 2012/0320212 A1 | 12/2012 | Aimura et al. | |
| 2014/0337548 A1 | 11/2014 | Miura | |
| 2014/0347470 A1 | 11/2014 | Zhang et al. | |
| 2017/0026618 A1 | 1/2017 | Mitsuta et al. | |
| 2017/0225617 A1 | 8/2017 | Morimura et al. | |
| 2017/0305342 A1 | 10/2017 | Tomioka | |
| 2018/0032824 A1 | 2/2018 | Yamamoto | |

FOREIGN PATENT DOCUMENTS

| | | |
|---|---|---|
| JP | 2013203103 A | 10/2013 |
| JP | 2014220640 A | 11/2014 |
| JP | 2015-141490 A | 8/2015 |
| JP | 2015185004 A | 10/2015 |
| JP | 2016035791 A | 3/2016 |
| JP | 2017-138817 A | 8/2017 |

OTHER PUBLICATIONS

United States Patent and Trademark Office, Non-Final Office Action issued to U.S. Appl. No. 15/422,069 dated May 14, 2018, 19 pages.
United States Patent and Trademark Office, Final Office Action issued to U.S. Appl. No. 15/422,069 dated Dec. 4, 2018, 18 pages.
United States Patent and Trademark Office, Advisory Action issued to U.S. Appl. No. 15/422,069 dated Mar. 14, 2019, 5 pages.
United States Patent and Trademark Office, Non-Final Office Action issued to U.S. Appl. No. 15/422,069 dated Apr. 16, 2019, 18 pages.
United States Patent and Trademark Office, Final Office Action issued to U.S. Appl. No. 15/422,069 dated Sep. 27, 2019, 19 pages.

* cited by examiner

PedW_TTC(P1's TTC)<CTA_TTC(P2's TTC)

CTA_TTC(OV's TTC)<PedW_TTC(P1's TTC)

WARNING DEVICE

CROSS-REFERENCE TO RELATED APPLICATION

The present application claims priority to Japanese Patent Application No. 2017-079170 filed on Apr. 12, 2017, which is incorporated herein by reference in its entirety.

BACKGROUND OF THE INVENTION

Field of the Invention

The present invention relates to a warning/alerting device which displays a warning screen for guiding driver's eyes (line of driver's sight) to a direction of an obstacle which has high probability of colliding with an own vehicle so as to warn/alert the driver of the obstacle (to notify the driver of the obstacle).

Hitherto, for example, as proposed in Japanese Patent Application Laid-open No. 2015-141490, a warning device (hereinafter referred to as a "conventional device") has been known, which displays an object image representing an object which is present around an own vehicle so as to warn/alert a driver of an obstacle. The conventional device displays the object image on a head up display with a focal point distance in accordance with an actual distance to the object so as to warn the driver of the object.

Therefore, the driver can notice the object as if the object is present at a location which is the actual distance away from the own vehicle.

SUMMARY OF THE INVENTION

However, the conventional device displays a plurality of object images to indicate a plurality of the directions of a plurality of the objects respectively at the same time, when the conventional device detects a plurality of the objects. In this case, the driver cannot determine which direction the driver should pay attention to. This causes the driver to be confused. Therefore, the conventional device cannot warn the driver appropriately. Especially, such a problem is likely to occur in the following warning device, and thus, needs to be solved. The warning device includes a detection unit (i.e. a camera and/or a radar device) which mainly detects an obstacle in a front area of a vehicle and a detection unit (i.e. a radar device) which mainly detects an obstacle in a side area of the vehicle, wherein those detection units are configured to detect the obstacle independently from each other.

The present invention has been made to solve the problem described above. An object of the present invention is to provide a warning/alert device which avoids a situation where the "driver is confused due to displaying a plurality of the directions of a plurality of the obstacles at the same time", so as to be able to appropriately warn/alert the driver so that the driver can appropriately pay attention to one of directions of the obstacles to which the driver should pay attention.

A warning device (hereinafter, referred to as "the present invention device") according to the present invention comprises:

a first detection unit (21, 22C, 30, 10 Step 605, and Step 610) for detecting at least one first object which is present either in a front area of the own vehicle or in a side area of the own vehicle and for identifying a type of the at least one first object;

a second detection unit (22L, 22R, 30, 10, and Step 705) for detecting at least one second object which is present in the side area without identifying the type of the at least one second object;

a first candidate selection unit (40) for:

selecting at least one type-identified object whose type is identified to be a predetermined type among the at least one first object detected by the first detection unit;

selecting, as at least one first obstacle, at least one object which has high probability of colliding with the own vehicle among the selected at least one type-identified object (Step 625);

calculating a collision time period (time to collision: TTC) which it takes for each of the at least one first obstacle to collide with the own vehicle (Step 635); and selecting, as a first candidate (PedW candidate), an obstacle whose collision time period is equal to or shorter than a predetermined threshold time period and is the shortest, among the at least one first obstacle ("Yes" at Step 640, and Step 645), a second candidate selection unit (50) for:

selecting, as at least one second obstacle, at least one object which has high probability of colliding with the own vehicle among the at least one second object detected by the second detection unit (Step 720);

calculating a collision time period (time to collision: TTC) which it takes for each of the at least one second obstacle to collide with the own vehicle (Step 730); and selecting, as a second candidate (CTA candidate), an obstacle whose collision time period is equal to or shorter than the threshold time period and is the shortest, among the at least one second obstacle ("Yes" at Step 735, and Step 740), a display unit (60) for displaying the warning screen (410 or 420); and a warning unit (10) for determining, as a warning object, one candidate with the shortest collision time period from the first candidate and the second candidate (Step 825 or Step 855), and for having the display unit display the warning screen which guides the driver's eyes to a direction of the warning object, when the first candidate selection unit has selected the first candidate and the second candidate selection unit has selected the second candidate (Step 840 or Step 845).

According to the present invention device, when both the first candidate and the second candidate have been selected, the warning screen which guides the driver's eyes only to the direction of one of the candidates whose collision time period is the shortest between the first candidate and the second candidate (i.e., only to the direction of one candidate with the shortest collision time period from the first candidate and the second candidate). Therefore, the present invention device can prevent the driver's eyes from being guided to a plurality of directions at the same time. Thus, the driver's eyes guidance by the present invention device can prevent the driver from getting confused. Accordingly, the present invention device can warn/notify appropriately the driver of/about the direction of one appropriate obstacle to which the driver should pay attention.

One aspect of the present invention resides in that warning unit is configured to:

determine that the first candidate is present in the front area of the own vehicle, when the first candidate has been determined as the warning obstacle (Step 825) and magnitude ($\theta p$) of a first angle (PedW angle) at a predetermined location (DP) of the own vehicle is equal to or smaller than a predetermined threshold angle ($\theta 1th$) ("Yes" at Step 835), the first angle being formed between a line which passes through a location of the first candidate (A1 or A2) and the predetermined location and a base line (BL) which passes through the predetermined location and is parallel with a longitudinal direction (FR) of the own vehicle to have the display unit display the warning screen (410) which guides the driver's eyes to the direction of the first candidate using a first display element (411) which guides the driver's eyes to the warning obstacle which is present in the front area of the own vehicle (Step 840); and determine that the first candidate is present in the side are of the own vehicle, when the first candidate has been determined as the warning obstacle and the magnitude of the first angle is larger than the threshold angle ("No" at Step 835) to have the display unit display the warning screen (420) which guides the driver's eyes to the direction of the first candidate using a second display element (421) which guides the driver's eyes to the warning obstacle which is present in the side area of the own vehicle and whose shape is different from a shape of the first display element (Step 845).

The shape of the display element which is displayed when the first candidate determined as the warning object is present in the front area of the own vehicle and the shape of the display element which is displayed when the first candidate determined as the warning object is present in the side area of the own vehicle are different from each other. Therefore, the driver can immediately/instantly determine whether the warning object is present in the front area of the own vehicle or in the side area of the own vehicle.

One aspect of the present invention resides in that the second detection unit is a radar sensor (22R or 22L) which radiates a radio wave to a sector area which has a center axis extending along a diagonal forward direction of the own vehicle to detect the at least one second object which is present in the side area of the own vehicle using a reflected wave of the radiated radio wave, and that the warning unit is configured to:
determine that the second candidate is present in the front area of the own vehicle, when the second candidate has been determined as the warning obstacle (Step 855) and magnitude ($\theta c$) of a second angle (CTA angle) at the predetermined location is equal to or smaller than the predetermined threshold angle ("Yes" at Step 865), the second angle being formed between a line which passes through a location of the second candidate and the predetermined location and the base line to have the display unit display the warning screen which guides the driver's eyes to the direction of the second candidate using the first display element (Step 840); and
determine that the second candidate is present in the side area of the own vehicle, when the magnitude of the second angle is larger than the predetermined threshold angle ("No" at Step 865) to have the display unit display the warning screen which guides the driver's eyes to the direction of the second candidate using the second display element (Step 845).

The second detection unit may detect the object which is present in a part of the front area of the own vehicle which is adjacent to the side area of the own vehicle in addition to the object which is present in the side area of the own vehicle, due to a manufacturing error of the second detection unit in an arrangement location and/or an arrangement angle of the second detection unit. In view of the above, the aspect of the present invention device determines whether or not the second candidate which has been determined as the warning object is present in the front area or in the side area based on the magnitude of the second angle. As a result, when the second candidate has been determined as the warning object, the aspect of the present invention device can make the "shape of the display element which is displayed when the second candidate is present in the front area of the own vehicle" and the "shape of the display element which is displayed when the second candidate is present in the side area of the own vehicle" different from each other. Therefore, the driver can determine whether the warning object is present in the front area of the own vehicle or in the side area of the own vehicle immediately and correctly.

One aspect of the present invention resides in that the second detection unit is a radar sensor (22R or 22L) which radiates a radio wave to a sector area which has a center axis extending along a diagonal front direction of the own vehicle so as to detect the at least one second object which is present in the side area of the own vehicle using a reflected wave of the radiated radio wave, and that the warning unit is configured to:
determine that the first candidate is present in the side area of the own vehicle to determine the first candidate as the warning obstacle (Step 874), when the collision time period of the first candidate is equal to the collision time period of the second candidate ("No" at Step 850) and the magnitude of the first angle is larger than the threshold angle ("No" at Step 872), to have the display unit display the warning screen which guides the driver's eyes to the direction of the first candidate using the second display element (Step 845);
determine that the first candidate is present in the front area of the own vehicle and that the second candidate is present in the side area of the own vehicle, and determine the second candidate as the warning obstacle (Step 880), when the collision time period of the first candidate is equal to the collision time period of the second candidate ("No" at Step 850), the magnitude of the first angle is equal to or smaller than the threshold angle ("Yes" at Step 872), and magnitude of a second angle at the predetermined location is larger than the predetermined threshold angle ("No" at Step 878), the second angle being formed between a line which passes through a location of the second candidate and the predetermined location and the base line, to have the display unit display the warning screen which guides the driver's eyes to the direction of the second candidate using the second display element (Step 845);
determine that both of the first candidate and the second candidate are present in the front area of the own vehicle to determine the first candidate as the warning obstacle (Step 882), when the collision time period of the first candidate is equal to the collision time period of the second candidate ("No" at Step 850), and both of the magnitude of the first angle and the magnitude of the second angle are equal to or smaller than the threshold angle ("Yes" at Step 872, and "Yes" at Step 878), and to have the display unit display the warning screen which guides the driver's eyes to the direction of the first candidate using the first display element (Step 840).

The aspect of the present invention device described above operates as follows, when the collision time period TTC of the first candidate is equal to the collision time period TTC of the second candidate.

(A) When the first candidate is present in the side area of the own vehicle, the aspect of the present invention device guides the driver's eye to the direction of the first candidate.

(B) When the first candidate is not present in the side area of the own vehicle and the second candidate is present in the front area of the own vehicle, the aspect of the present invention device guides the driver's eye to the direction of the second candidate.

(C) When the first candidate is not present in the side area of the own vehicle and the second candidate is not present in the side area of the own vehicle, in other words, both of the first candidate and the second candidate are present in the front area of the own vehicle, the aspect of the present invention device guides the driver's eye to the direction of the first candidate.

It is more difficult for the driver to notice the candidate which is present in the side area of the own vehicle than to notice the candidate which is present in the front side area. Therefore, when both of the two candidates are present with the same probability of colliding with own vehicle, the aspect of the present invention device can guide the driver's eyes to a direction of the candidate in the side area of the own vehicle. Furthermore, when both of the first candidate and the second candidate are present in the front area of the own vehicle with the same probability of colliding with the own vehicle, the aspect of the present invention device can guide the driver's eyes to a direction of the first candidate whose type has been identified as the predetermined type.

One aspect of the present invention resides in that the second detection unit is a radar sensor (22R or 22L) which radiates a radio wave to a sector area which has a center axis extending along a diagonally forward direction of the own vehicle to detect the at least one second object which is present in the side area of the own vehicle using a reflected wave of the radiated radio wave, and that the warning unit is configured to:
presume that the second candidate is present in the side area of the own vehicle, when the second candidate is determined as the warning obstacle (Step 855); and
have the display unit display the warning screen which guides the driver's eyes to the direction of the second candidate using the second display element (Step 840).

When the second detection unit is the above described radar sensor, the second detection unit may occasionally detect the object which is present in a part of the front area of the own vehicle, due to the manufacturing error of the second detection unit in the arrangement location and/or the arrangement angle of the second detection unit. However, it is highly likely that the object detected by the second detection unit is present in the side area of the own vehicle. Accordingly, when the second candidate which is the object detected by the second detection unit has been determined as the warning device, the aspect of the present invention device presumes that the second candidate determined as the warning device is present in the side area of the own vehicle without calculating the second angle. Then, the aspect of the present invention device guides the driver's eyes to the second candidate using the second display element. Accordingly, the aspect of the present invention device can decrease a process load of itself, and can guide the driver's eyes to the second candidate which is present in the side area of the own vehicle in most cases.

One aspect of the present invention resides in that the second detection unit is a radar sensor (22R or 22L) which radiates a radio wave to a sector area which has a center axis extending along a diagonally forward direction of the own vehicle to detect the at least one second object which is present in the side area of the own vehicle using a reflected wave of the radiated radio wave, and that the warning unit is configured to:
determine that the first candidate is present in the side area of the own vehicle to determine the first candidate as the warning obstacle, when the collision time period of the first candidate is equal to the collision time period of the second candidate ("No" at Step 850) and the magnitude of the first angle is larger than the threshold angle ("No" at Step 872), to have the display unit display the warning screen which guides the driver's eyes to the direction of the first candidate using the second display element (Step 845); and
determine that the first candidate is present in the front area of the own vehicle and presume that the second candidate is present in the side area of the own vehicle to determine the second candidate as the warning obstacle (Step 880), when the collision time period of the first candidate is equal to the collision time period of the second candidate ("No" at Step 850) and the magnitude of the first angle is equal to or smaller than the threshold angle ("Yes" at Step 872), to have the display unit display the warning screen which guides the driver's eyes to the direction of the second candidate using the second display element (Step 845).

As described above, when the second detection unit is the above described radar sensor, the second detection unit detects the object which is present in the side area of the own vehicle in most cases, although the second detection unit may occasionally detect the object which is present in a part of the front area of the own vehicle. Therefore, when the collision time period TTC of the first candidate is equal to the collision time period TTC, the aspect of the present invention device operates as follows.

(D) When the first candidate is present in the side area of the own vehicle, the aspect of the present invention device guides the driver's eyes to the direction of the first candidate.

(E) When the first candidate is not present in the side area of the own vehicle, the aspect of the present invention device guides the driver's eyes to the direction of the second candidate which can be presumed to be present in the side area of the own vehicle.

It is more difficult for the driver to notice the candidate which is present in the side area of the own vehicle than to notice the candidate which is present in the front side area. Therefore, when both of the two candidates are present with the same probability of colliding with own vehicle, the aspect of the present invention device can guide the driver's eyes to a direction of the candidate in the side area of the own vehicle. Furthermore, the present invention device does not have to calculate the second angle so as to be able to decrease the process load itself.

One aspect of the present invention resides in that the first detection unit includes:
a camera sensor (21) which photographs the front area and the side area of the own vehicle, detects the at least one first object which is present either in the front area or in the side area based on a photographed image, and identifies the type of each of the at least one first object based on the photographed image; and
a front radar sensor (22C) which radiates a radio wave to the front area of the own vehicle and a radio wave to the side area of the own vehicle to detect the at least one first object which is present either in the front area or in the side area, and
and in that the first candidate selection unit is configured to select the at least one first object whose type is identified, by the first detection unit, to be any one of a pedestrian, a bicycle, and a motorcycle.

The first candidate which the first candidate selection unit has selected is any one of the pedestrian, the bicycle, and the motorcycle. Therefore, the aspect of the present invention device can on a priority basis (preferentially) guide the driver's eyes to the direction of any one of the pedestrian, the bicycle, and the motorcycle that are more difficult to be noticed by the driver than a vehicle.

The present invention device comprises:

a first detection unit (21, 22C, 30, 10, Step 605, and Step 610) for detecting at least one first object which is present either in the front area or in the side area, and for identifying a type of each of the at least one first object;

a second detection unit (22L, 22R, 30, 10, and Step 705) for detecting at least one second object which is present in the side area without identifying the type of each of the at least one second object;

a display unit (60) for displaying a warning screen (410 or 420); and a warning unit (10) for having the display unit display the warning screen which guides the driver's eyes to a single direction of an object whose collision time period (time to collision: TTC) which it takes for the object to collide with the own vehicle is the shortest among the at least one first object which the first detection unit has detected and the at least one second object which the second detection unit has detected (Step 840 or Step 850).

When the first detection unit detects the object and the second detection unit detects the object, the warning screen which guides the driver's eyes only to the direction of the object whose collision time period is the shortest. Therefore, the aspect of the present invention device can prevent the driver's eyes from being guided to a plurality of directions at the same time. This driver's eyes guidance can prevent the driver from getting confused. Furthermore, the driver's eyes are guided only to the direction of the object whose collision time period is the shortest. Therefore, the aspect of the present invention device can warn appropriately the driver of the direction of one appropriate obstacle to which the driver should pay attention.

In the above description, in order to facilitate the understanding of the invention, reference symbols used in embodiment of the present invention are enclosed in parentheses and are assigned to each of the constituent features of the invention corresponding to the embodiment. However, each of the constituent features of the invention is not limited to the embodiment as defined by the reference symbols. Other objects, other features, and attendant advantages of the present invention will be readily appreciated from the following description of the embodiment of the invention which is made with reference to the accompanying drawings.

DESCRIPTION OF THE PREFERRED EMBODIMENTS

A warning/alert device according to one embodiment of the present invention will next be described with reference to the accompanying drawings.

Figure 1:
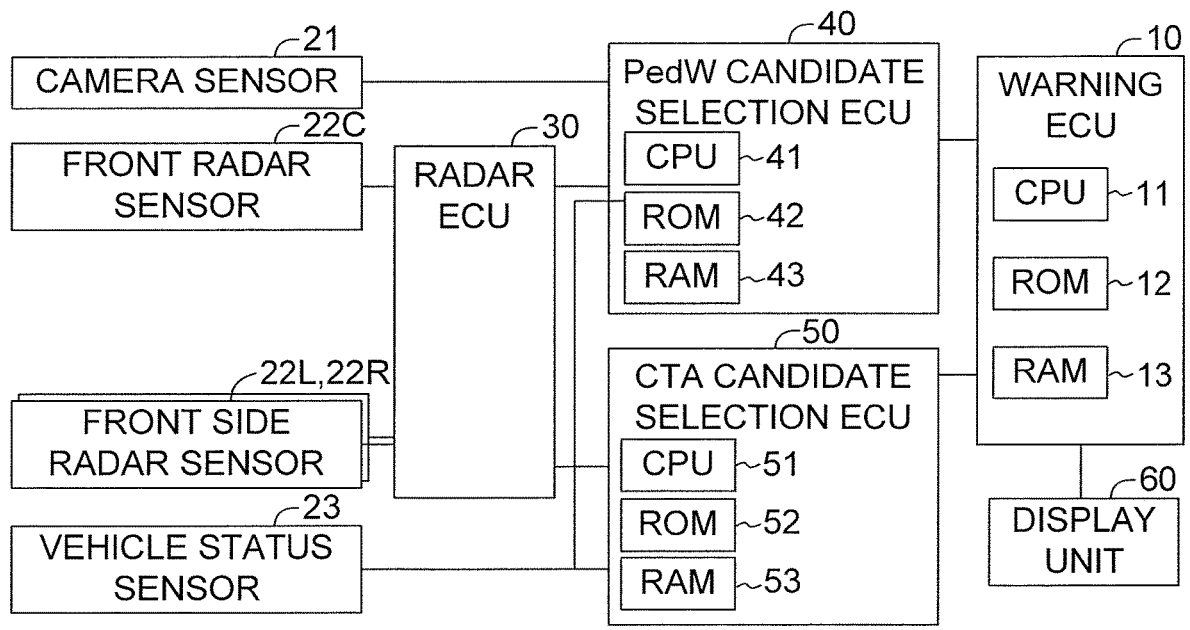
FIG. 1 is a schematic configuration diagram for illustrating a warning device according to an embodiment of the present invention.

FIG. 1 is a schematic configuration diagram of the warning device (hereinafter referred to as a "control device") according to the embodiment of the present invention. A vehicle in which the warning device is mounted/installed is referred to as an "own vehicle SV", when this vehicle needs to be distinguished from other vehicles. The control device displays a warning/alert screen which warns/alerts a driver of the own vehicle SV of an obstacle which has high probability of colliding with the own vehicle SV.

The control device includes a warning ECU 10. It should be noted that an ECU is an abbreviation of an "Electric Control Unit" which includes a microcomputer as a main part. The microcomputer of the ECU 10 includes a CPU 11 and memories (for example, a ROM 12, a RAM 13, and the like). The CPU 11 achieves various functions by executing instructions (program, routine) stored in the ROM 12.

The control device further includes a camera sensor 21, a front radar sensor 22C, front side radar sensors 22L and 22R, a vehicle status sensor 23, a radar ECU 30, a pedestrian warning (PedW) candidate selection ECU 40, a cross traffic alarm (CTA) candidate selection ECU 50, and a display unit 60. The warning ECU 10 is connected with the PedW candidate selection ECU 40, the CTA candidate selection ECU 50, and the display unit 60.

The camera sensor 21 includes a vehicle-mounted (on-board) stereo camera device (not shown) and an image processing device (not shown). The vehicle-mounted stereo camera device photographs (takes images of) a front area, a part of a right side area, and a part of a left side area of the own vehicle SV. The image processing device processes images photographed by the vehicle-mounted stereo camera device. The camera sensor 21 is connected with the PedW candidate selection ECU 40.

Figure 2:
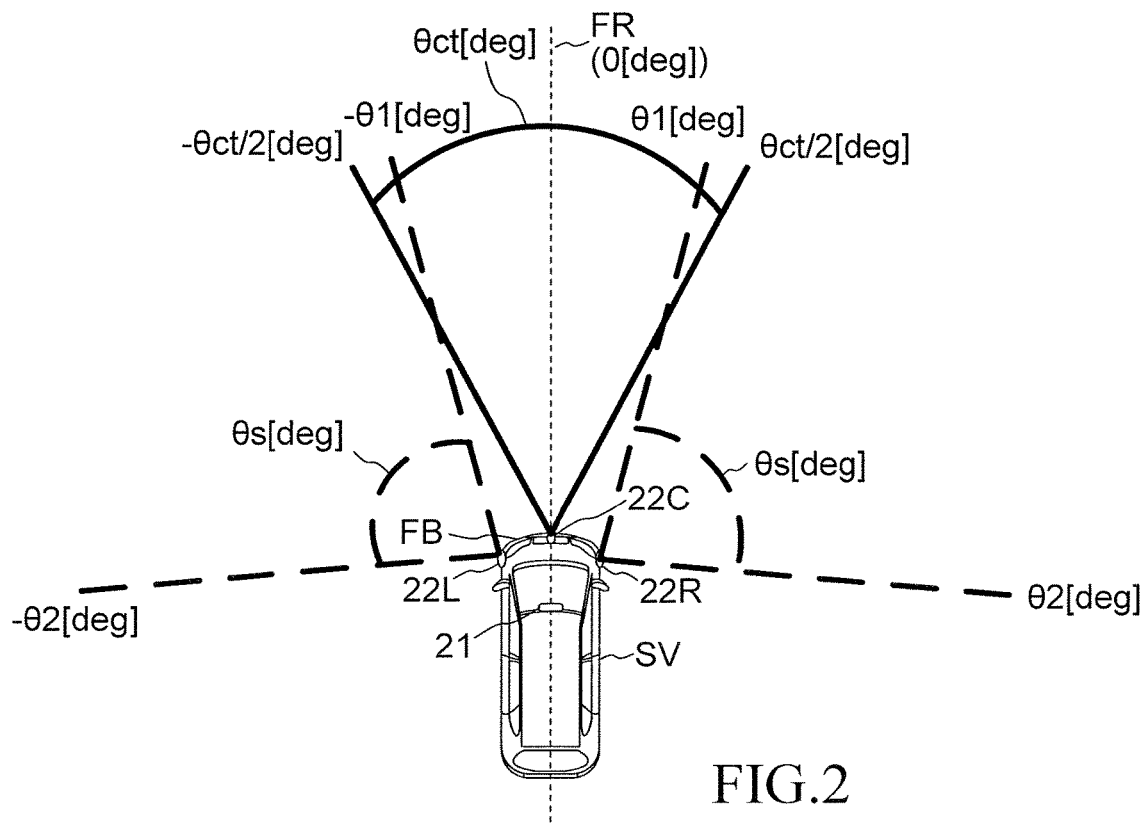
FIG. 2 is a diagram for illustrating arrangement locations of radar sensors and a camera sensor and a detection area of each the radar sensor.

As shown in FIG. 2, the vehicle-mounted stereo camera device is arranged in the vicinity of a center in a width direction of a front end of a roof of the own vehicle SV. In detail, the vehicle-mounted stereo camera device includes a left camera arranged on a left side of a vehicle longitudinal axis FR (referring to FIG. 2) and a right camera arranged on a right side of the vehicle longitudinal axis FR. The left camera photographs the front area and a part of the left side area of the own vehicle SV, and transmits, to the image processing unit, a left image signal representing a left image photographed by the left camera, every time a predetermined time period elapses. Similarly, the right camera photographs the front area and a part of the right side area of the own vehicle SV, and transmits, to the image processing unit, a right image signal representing a right image photographed by the right camera, every time the predetermined time period elapses.

The image processing unit determines whether or not an object is present in an area which is photographed by the camera sensor 21 based on the left image signal and the right image signal. The image processing unit calculates a location/position of the object, and identifies a type (a pedestrian, a bicycle, a two-wheeler, or the like) of the object, when the object is present. The image processing unit identifies the location of the object by a direction of the object in relation to the own vehicle SV and a distance between the object and the own vehicle SV. Furthermore, the image processing unit compares images represented by image signals (the right image signal and the left image signal) with each template image corresponding to each type of the object so as to identify the type of the object. The image processing unit stores each template image corresponding to each type in advance.

The camera sensor 21 transmits object information including location information of the object whose type is the "pedestrian" to PedW candidate selection ECU 40, every time a predetermined time period elapses.

As shown in FIG. 2, the front radar sensor 22C is arranged at a center of a front bumper FB of the own vehicle SV in a width direction. The front side radar sensor 22R is arranged at a right corner of the front bumper FB. The front side radar sensor 22L is arranged at a left corner of the front bumper FB. The front radar sensor 22C and the front side radar sensors 22L and 22R are collectively referred to as "radar sensors 22". Those radar sensors 22 are connected with the radar ECU 30.

Each of the radar sensors 22 detects a location of the object and a relative velocity of the object in relation to the own vehicle SV, using a radio wave in a millimeter waveband (hereinafter referred to as "millimeter wave"). In detail, each of the radar sensors 22 radiates (transmits) a millimeter wave, and receive a millimeter wave (reflected wave) which is reflected by the object which is a three-dimensional object in a radiation range of the millimeter wave. Each of the radar sensors 22 transmits "transmitted and received data" of the millimeter wave to the radar ECU 30.

As shown in FIG. 2, a detection angle range of the front radar sensor 22C includes a "range from the vehicle longitudinal axis FR (it is assumed that an angle for a front direction is "0 deg") to θct/2 in a right direction" and a "range from the vehicle longitudinal axis FR to θct/2 in a left direction". In other words, the detection angle range of the front radar sensor 22C is θct (0 deg<θct<180 deg) around the vehicle longitudinal axis FR. A total range of a "range from a base line BL to an angle θ1th in the right direction" and a "range from the base line BL to an angle θ1th in the left direction" is defined as a front area of the own vehicle SV. The base line BL is a line which passes through a predetermined location DP (referring to FIG. 3) within the own vehicle SV and is parallel with the vehicle longitudinal axis FR. The front radar sensor 22C mainly detects the object which is present in the front area of the own vehicle SV, and the front radar censor 22C can detect the object which is present in a part of the right side area of the own vehicle SV and the object which is present in a part of the left side area of the own vehicle SV.

A detection angle range of the front side radar sensor 22R ranges from a "direction of θ1 deg (0 deg<θ1<90 deg) toward the right direction with respect to the vehicle longitudinal axis FR to a "direction of θ2 deg (90 deg<θ2<180 deg) toward the right direction with respect to the vehicle longitudinal axis FR". When it is assumed that following numerical expression (θ2 deg−θ1 deg=θsdeg) is satisfied, a magnitude of the detection angle range of the front side radar sensor 22R is "θsdeg" as illustrated in FIG. 2. The front side radar sensor 22R detects the object in the right side area of the own vehicle SV. In other words, the front side radar sensor 22R is a radar sensor which radiates the millimeter wave (radio wave) to a sector area which has a center axis extending along a diagonal front direction (θ=(θ1 deg+θ2 deg)/2) of the own vehicle SV so as to detect the object in the right side area of the own vehicle SV using the reflected wave of the radiated radio wave. The front side radar sensor 22R may detect the object which is present in a part of the front area of the own vehicle SV which is adjacent to the right side area in addition to the object which is present in the right side area, depending on an arrangement location and/or an arrangement angle of the front side radar sensor 22R, and/or due to an error of the detection range of the front side radar sensor 22R.

Similarly, a detection angle range of the front side radar sensor 22L and the detection angle range of the front side radar sensor 22R are symmetrical about the vehicle longitudinal axis FR. Therefore, the front side radar sensor 22L detects the object which is present in the left side area of the own vehicle SV. In other words, the front side radar sensor 22L is a radar sensor which radiates the millimeter wave (radio wave) to a sector area which has a center axis extending along a diagonal front direction (θ=−(θ1 deg+θ2 deg)/2) of the own vehicle SV so as to detect the object in the left side area of the own vehicle SV using the reflected wave of the radiated radio wave. The front side radar sensor 22L may detect the object which is present in a part of the front area of the own vehicle SV which is adjacent to the left side area in addition to the object which is present in the left side area, depending on an arrangement location and/or an arrangement angle of the front side radar sensor 22R, and/or due to an error of the detection range of the front side radar sensor 22R.

A detection length/distance of each of the radar sensors 22 is about 100 meters.

The radar ECU 30 includes a CPU (not shown) and a memory (for example, a ROM, a RAM, and the like) (not shown). The radar ECU 30 is connected to the PedW candidate selection ECU 40 and the CTA candidate selection unit 50. The radar ECU 30 detects the object based on the "transmitted and received data" transmitted from each of the radar sensors 22. The radar ECU 30 obtains the "transmitted and received data" from each of the radar sensors 22, every time a predetermined time period elapses, and determines whether or not an object is present based on the obtained "transmitted and received data". When the object is present, the radar ECU 30 calculates a distance between the object and the own vehicle SV based on a time period from transmission of the millimeter wave to receipt of the reflected millimeter wave, and calculates a direction of the object in relation to the own vehicle SV based on a direction of the reflected millimeter wave. The location of the object in relation to the own vehicle SV is identified by the distance from the own vehicle SV to the object and the direction of the object in relation to the own vehicle SV. Furthermore, the radar ECU 30 calculates a relative velocity of the object in relation to the own vehicle SV based on frequency change (by the Doppler effect) of the reflected millimeter wave.

The radar ECU 30 transmits, to the PedW candidate selection ECU 40, the object information which is obtained based on the "transmitted and received data" from the front radar sensor 22C. The radar ECU 30 transmits, to the CTA candidate selection ECU 50, the object information which is obtained based on the "transmitted and received data" from the front side radar sensor 22R and the front side radar sensor 22L. It should be noted that the object information includes presence information representing whether or not the object is present. When the object is present, the object information includes the location information of the object (the distance from the own vehicle SV to the object and the direction of the object in relation to the own vehicle SV) and the relative velocity of the object.

The vehicle status sensor 23 includes sensors which obtain/detect vehicle status information on a traveling status of the own vehicle. The vehicle status information is necessary to predict a predicted traveling path (course, trajectory) of the own vehicle SV. The vehicle status sensor 23 is connected to the PedW candidate selection unit 40 and the CTA candidate selection unit 50. The vehicle status sensor 23 includes a vehicle velocity sensor which detects velocity of the own vehicle SV, an acceleration sensor which detects acceleration of the own vehicle SV in a longitudinal direction on the own vehicle SV's horizontal plane and acceleration of the own vehicle SV on a width direction of the own vehicle SV's horizontal plane, a yaw rate sensor which detects a yaw rate of the own vehicle SV, a steering angle sensor which detects a steering angle of a steering wheel of the own vehicle SV, or the like. The vehicle status sensor 23 transmits the vehicle status information to the PedW candidate selection ECU 40 and the CTA candidate selection ECU 50, every time a predetermined time period elapses.

The PedW candidate selection ECU 40 obtains the object information of the object whose type is the pedestrian from the camera sensor 21 and the object information which is obtained based on the "transmitted and received data" from the front radar sensor 22C, every time the predetermined time period elapses. The PedW candidate selection ECU 40 obtains the vehicle status information from the vehicle status sensor 23, every time the predetermined time period elapses.

The PedW candidate selection ECU 40 selects, as an obstacle(s), at least one object which has high probability of colliding with the own vehicle SV from/among the objects each of which type has been determined/identified to be the pedestrian by the camera sensor 21, based on the obtained location information, the obtained object information, and the vehicle status information, using the following method (refer to step 625). The object selected as the obstacle may include an object which is predicted not to collide with the own vehicle SV but to have a narrow margin of clearance between the object and the own vehicle SV (or to extremely approach to the own vehicle SV). The PedW candidate selection ECU 40 calculates time to collision TTC (collision time period) for each obstacle to collide with the own vehicle SV or to reach the closest point to the own vehicle SV. Further, when the time to collision TTC which is shortest/minimum among the calculated times to collision TTCs is equal to or shorter than a predetermined threshold time period T1*th*, the PedW candidate selection ECU 40 determines (selects) a pedestrian which corresponds to the obstacle whose time to collision TTC is shortest/minimum as a PedW candidate which is a candidate of which the warning ECU 10 warns the driver. The PedW candidate selection ECU 40 transmits PedW candidate information which includes location information of the PedW candidate and the time to collision TTC of the PedW candidate to the warning ECU 10. Details of a process for selecting the at least one obstacle and a process for calculating the time to collision TTC are described later.

In other words, the PedW candidate selection ECU 40 calculates the time to collision TTC of each of the pedestrians which is present in the front area, the right side area, or the left side area of the own vehicle SV and which has high probability of colliding with the own vehicle SV. The PedW candidate selection ECU 40 transmits the PedW candidate information to the warning ECU 10 when the shortest/minimum time to collision TTC is equal to or shorter than the threshold time period T1*th*. The PedW candidate may be referred to as a "first candidate", and the PedW candidate selection ECU 40 may be referred to as a "first candidate selection unit".

The CTA candidate selection ECU 50 obtains, from the radar ECU 30, the object information which is obtained based on the "transmitted and received data" from the front side radar sensor 22L and 22R, every time the predetermined time period elapses. The CTA candidate selection ECU 50 obtains the vehicle status information from the vehicle status sensor 23, every time the predetermined time period elapses.

The CTA candidate selection ECU 50 selects, as an obstacle(s), at least one object which has high probability of colliding with the own vehicle SV from/among the objects which have been detected by the radar sensor 22L and/or 22R, based on the obtained object information and the vehicle status information, using the following method (refer to step 720). The object selected as the obstacle may include an object which is predicted not to collide with the own vehicle SV but to have a narrow margin of clearance between the object and the own vehicle SV (or to extremely approach to the own vehicle SV). The CTA candidate selection ECU 50 does not use the object information obtained by the camera sensor 21. The CTA candidate selection ECU 50 uses only the object information obtained by the front side radar sensors 22L and 22R. Therefore, the CTA candidate selection ECU 50 cannot identify/specify the type of the object. Accordingly, the CTA candidate selection ECU 50 selects the obstacle from/among all of the objects detected by the front side radar sensors 22L and/or 22R regardless of the types of the objects.

The CTA candidate selection ECU 50 calculates time to collision TTC (collision time period) for each of the obstacles to collide with the own vehicle SV or to reach the closest point to the own vehicle SV. Further, when the time to collision TTC which is shortest/minimum among the calculated times to collision TTC is equal to or shorter than a predetermined threshold time period T1*th*, the CTA candidate selection ECU 50 determines (selects) the obstacle whose time to collision TTC is shortest/minimum as a CTA candidate which is a candidate of which the warning ECU 10 warns the driver. The CTA candidate selection ECU 50 transmits, to the warning ECU 10, CTA candidate information which includes location information of the CTA candidate and the time to collision TTC of the CTA candidate. Details of a process for selecting the obstacle and a process for calculating the time to collision TTC are described later.

In other words, the CTA candidate selection ECU 50 calculates the time to collision TTC of each of the obstacles which is present in the left side area or the right side area of the own vehicle SV and which has high probability of colliding with the own vehicle SV. The CTA candidate selection ECU 50 transmits the CTA candidate information to the warning ECU 10 when the shortest/minimum time to collision TTC is equal to or shorter than the threshold time period T1*th*. The CTA candidate may be referred to as a "second candidate", and the CTA candidate selection ECU 50 may be referred to as a "CTA candidate selection unit".

As described above, the front side radar sensors 22L usually detects the object(s) present in the left side area, and the front side radar sensors 22R usually detects the object(s) present in the right side area, however, each of the front side radar sensors 22L and 22R may detect the object(s) in the front area of the own vehicle SV, due to a detection error and/or manufacturing error, for example, in the arrangement location and/or the arrangement angle of each of the front side radar sensors 22L and 22R. Therefore, the CTA candidate selection ECU 50 may determine the object in the front area of the own vehicle SV as the CTA candidate.

The display unit 60 is a "Head Up Display" (hereinafter referred to as a "HUD") which receives display information from each of the ECUs in the own vehicle SV and a navigation device, and displays the received display information on a partial area (a display area) of a front glass of the own vehicle SV. A warning screen (referring to FIGS. 4A through 4C) is displayed on the display unit 60. The warning screen is a screen which guides the driver's eyes (line of sight of the driver) to the direction of the obstacle which has high probability of colliding with the own vehicle so as to warn the driver of the obstacle. The display unit 60 displays the warning screen when the display unit 60 receives a display command of the warning screen from the warning ECU 10.

<Outline of Operation>

An operation of the control device will next be described. When the control device has detected the PedW candidate and the CTA candidate, the control device determines/specifies/selects one (a single) candidate of which the control device warns the driver (hereinafter referred to as a "warning object") from the PedW candidate and the CTA candidate. It should be noted that, when the control device detects either the PedW candidate or the CTA candidate, the control device determines the detected candidate to be the warning object. Thereafter, the control device displays the warning screen which guides the driver's eyes to a direction of the determined warning object. In detail, when the control device detects both the PedW candidate and the CTA candidate, the control device determines one candidate whose time to collision TTC is shorter than the other candidate as the warning object, and the control device displays the warning screen which guides the driver's eyes to only the direction of the warning object. When the control device displays the warning screen, the control device has to determine in which area the warning object (that is, either one of the PedW candidate and the CTA candidate) is present, the front area, or one of the side areas of the own vehicle SV. A method for making the above determination that the control device uses/adopts will next be described with reference to FIG. 3.

The control device calculates, as magnitude of an warning angle (θ1 or θ2 in FIG. 3, hereinafter referred to as a "θ"), magnitude of an angle (at a predetermined location DP of the own vehicle SV) formed between a "line (LA1 or LA2 in FIG. 3) which passes through the warning object (a point A1 or a point A2 in FIG. 3) and the predetermined location DP" and a "base line BL which passes through the predetermined location DP and which is parallel with the longitudinal direction FR of the own vehicle SV". The predetermined location DP is a center in a width direction of a driver's seat of the own vehicle SV. In other words, the predetermined location DP corresponds to a location/position of the driver's eyes when the driver sits on the driver's seat. In detail, the predetermined location DP is a location between a seat back of the driver's seat and a steering wheel which is arranged in front of the seat back.

Figure 3:
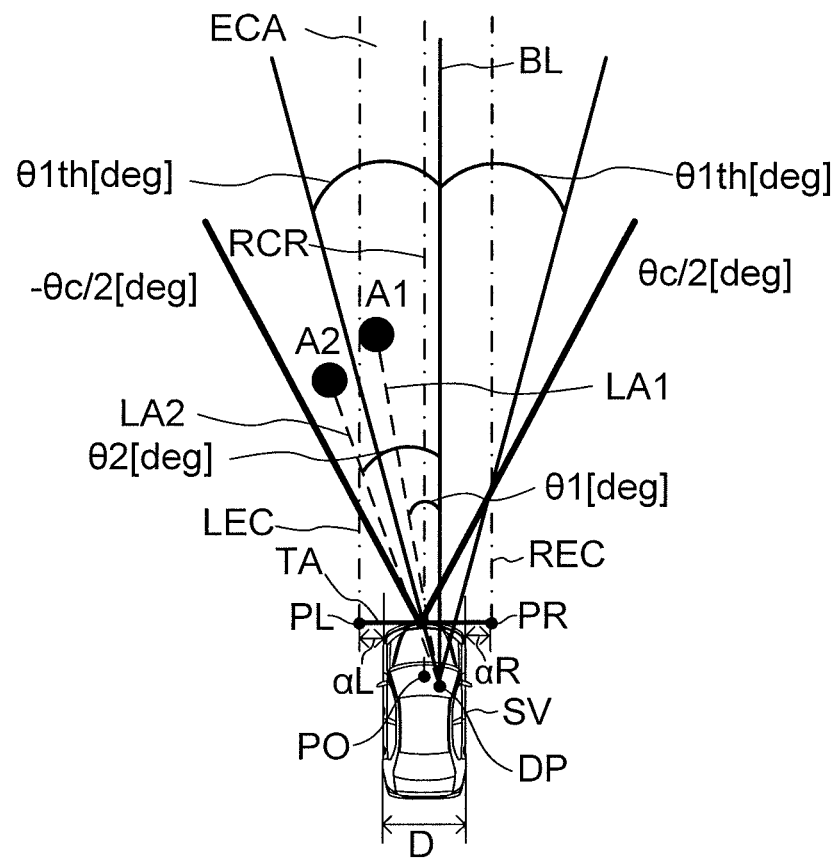
FIG. 3 is a diagram for illustrating a PedW angle and a threshold angle.
Figure 4A:
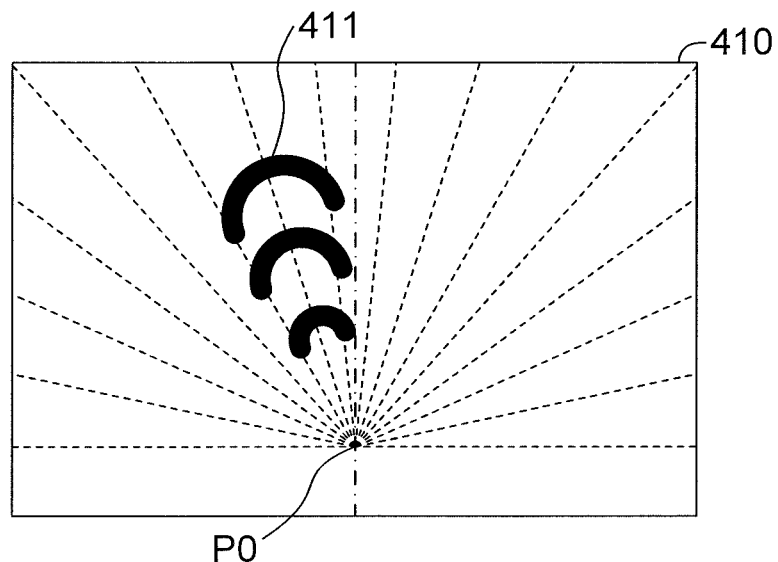
FIG. 4A is a diagram for illustrating a front warning screen.
Figure 4B:
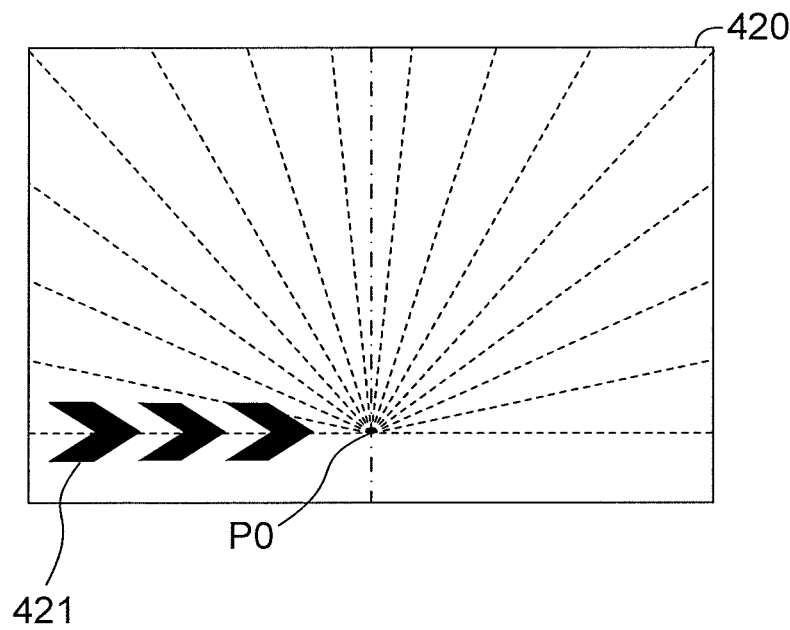
FIG. 4B is a diagram for illustrating a side warning screen of a warning object whose moving direction is from a left side to a right side.
Figure 4C:
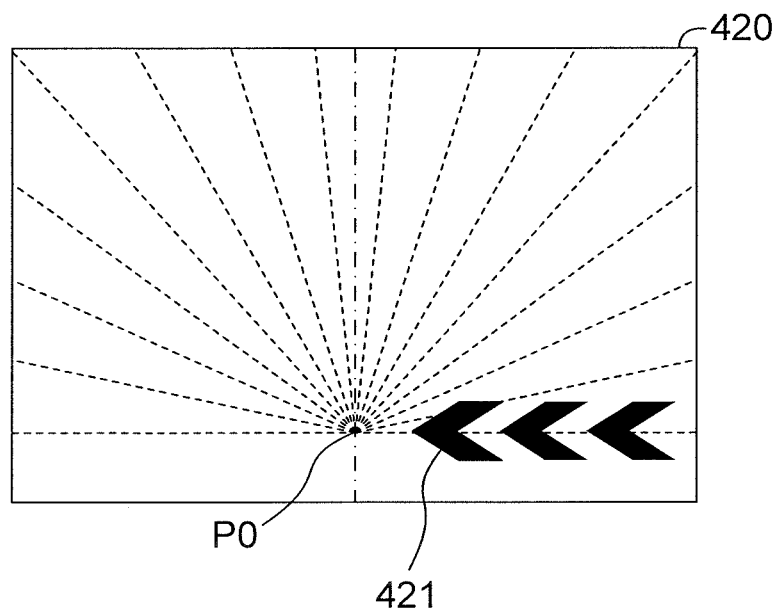
FIG. 4C is a diagram for illustrating the side warning screen of the warning object whose moving direction is from the right side to the left side.

The control device determines whether or not the magnitude of the warning angle (θ) is equal to or smaller than a threshold angle θ1*th*. When the magnitude of the warning angle (θ) is equal to or smaller than the threshold angle θ1*th*, the control device determines that the warning object is present in the front area of the own vehicle SV, and displays a front warning screen 410 which is illustrated in FIG. 4A. When the magnitude of the warning angle (θ) is larger than the threshold angle θ1*th*, the control device determines that the warning object is present in either of the side areas of the own vehicle SV, and displays a side warning screen 420 which is illustrated in FIG. 4B or FIG. 4C. In FIG. 3, the magnitude θ1 of the warning angle of the warning object A1 is equal to or smaller than the threshold angle θ1*th*. Therefore, the control device displays the front warning screen 410. On the other hand, the magnitude θ2 of the warning angle of the warning object A2 is larger than the threshold angle θ1*th*. Therefore, the control device displays the side warning screen 420.

The front warning screen 410 will next be described with reference with FIG. 4A. A front eyes guidance icon (or mark) 411 for guiding the driver's eyes to the direction of the warning object which is present in the front area of the own vehicle SV is displayed on the front warning screen 410. A display area of the display unit 60 is arranged in an area of the front glass and in front of the driver's seat of the own vehicle SV. A center line of the display area is illustrated by a chain line (a dot-and-dash line) in FIG. 4A. The center line corresponds to the base line BL shown in FIG. 3. Although the center line is illustrated for convenience of explanation, the center line is not actually displayed on the display area.

As illustrated in FIG. 4A, the front eyes guidance icon 411 has three arcs which line up. The front eyes guidance icon 411 may be referred to as a "beam display icon". An arc length of each of the three arcs becomes longer as a distance between each of the arcs and a predetermined location P0 is longer. These three arcs are sequentially lighted (turned on) in order from the one closest to the position P0.

The front eyes guidance icon 411 or a side eyes guidance icon 421 (refer to FIGS. 4B and 4C) described below can be displayed every predetermined angle range (every 12 deg) (or at an interval of the predetermined angle), which is obtained by dividing an angle range (180 deg) between a "horizontal line which is perpendicular to the center line of the display area and which extends from the position P0 to the right direction" and a "horizontal line which is perpendicular to the center line of the display area and which extends from the position P0 to the left direction" into 15 equal parts. The front eyes guidance icon 411 and the side eyes guidance icon 421 are collectively referred to as "eyes guidance icons", when they do not need to be distinguished from each other. Although locations (axis lines) on which the eyes guidance icons can be displayed are illustrated by dot-lines in FIGS. 4A through 4C, these dot-lines are not displayed on the display area in actuality. In the example illustrated in FIG. 3, the threshold angle θ1*th* is 25 deg. Therefore, the front eyes guidance icon 411 can be displayed on/along one of a "first line (−6 deg) in the left direction from the center line (0 deg) of the display area", a "second line (−18 deg) in the left direction from the center line (0 deg)", a "first line (6 deg) in the right direction from the center line (0 deg)", and a "second line (18 deg) in the right direction from the center line (0 deg)". The side eyes guidance icon 421 (referring to FIGS. 4B and 4C) can be displayed on/along any "one of lines from a third line (−30 deg) to a eighth line (−90 deg) in the left direction from the center line (0 deg) of the display area" or any "one of lines from a third line (30 deg) to a eighth line (90 deg) in the right direction from the center line (0 deg) of the display area".

The side warning screen 420 will next be described with reference to FIGS. 4B and 4C. The side eyes guidance icon 421 for guiding the driver's eyes to the direction of the warning object which is present in one of the side areas of the own vehicle SV is displayed on the side warning screen 420. The center line of the display area is illustrated by a chain line (a dot-and-dash line) in each of FIGS. 4B and 4C. The center line corresponds to the base line BL shown in FIG. 3. Although the center line is illustrated for convenience of explanation, the center line is not displayed on the display area in actuality.

As illustrated in FIGS. 4B and 4C, the side eyes guidance icon 421 has three wedges which line up. The side eyes guidance icon 421 may be referred to as a "wedge display icon". Directions of those wedges represent a moving direction of the warning object. The side eyes guidance icon 421 illustrated in FIG. 4B represents that the warning object is present in the left side area and that the warning object is moving toward the own vehicle SV (the warning object is moving rightward). The side eyes guidance icon 421 illustrated in FIG. 4C represents that the warning object is present in the right side area and that the warning object is moving toward the own vehicle SV (the warning object is moving leftward).

The three wedges of the side eyes guidance icon 421 are sequentially lighted (turned on) in the order corresponding to the moving direction of the warning object. More specifically, the side eyes guidance icon 421 illustrated in FIG. 4B is sequentially turned on in the order of the leftmost wedge, the middle wedge, and the rightmost wedge. The side eyes guidance icon 421 illustrated in FIG. 4C is sequentially turned on in order of the rightmost wedge, the middle wedge, and the leftmost wedge.

As described above, the shape of the side eyes guidance icon 421 is different from the shape of the front eyes guidance icon 411. The side eyes guidance icon 421 has the shape which guides the driver's eyes to the side area more easily. The front eyes guidance icon 411 may be referred to as a "first display element", and the side eyes guidance icon 421 may be referred to as a "second display element".

In this manner, the shape of the eyes guidance icon which is displayed when the warning object is present in the front area of the own vehicle SV and the shape of the eyes guidance icon which is displayed when the warning object is present in one of the side areas of the own vehicle SV are different from each other. When the warning object is present in one of the side areas of the own vehicle SV, the driver may have a probability of paying no attention to the warning object. Therefore, the side eyes guidance icon 421 whose shape is different from the shape of the front eyes guidance icon 411 and which has the driver's eyes direct to the side direction more easily is displayed. Thereby, even if the warning object is present in one of the side areas of the warning object, the "possibility that the driver's eyes are guided to the direction of the warning object and that the driver pays attention to the warning object" can be increased.

As described above, when both of the PedW candidate and the CTA candidate have been detected, the control device determines/selects/designates one candidate with the shortest time to collision TTC from the PedW candidate and the CTA candidate, as the warning object. An operation of the control device in each of cases of the following (A) through (C) will next be described.

(A) The time to collision TTC of the PedW candidate (hereinafter, referred to as a "PedW_TTC") is shorter than the time to collision TTC of the CTA candidate (hereinafter, referred to as a "CTA_TTC").

(B) The PedW_TTC is longer than the CTA_TTC.

(C) The PedW_TTC is equal to the CTA_TTC.

(A) When the PedW_TTC is shorter than the CTA_TTC, the control device determines/designates the PedW candidate as the warning object, and displays the warning screen which guides the driver's eyes only to the direction of the PedW candidate.

The PedW candidate which has been determined as the warning object is present/located in the front area of the own vehicle SV or in one of side areas of the own vehicle SV. Therefore, the control device determines whether the PedW candidate is present in the front area or in one of the side areas of the own vehicle SV, using the above described method. More specifically, the control device calculates the magnitude of the warning angle of the PedW candidate θ (hereinafter, referred to as a "magnitude θp of the PedW angle"), and determines whether or not the magnitude θp of the PedW angle is equal to or smaller than the threshold angle θ1$th$.

When the magnitude θp of the PedW angle is equal to or smaller than the threshold angle θ1$th$, the control device determines that the PedW candidate which has been determined as the warning object is present in the front area of the own vehicle SV to display the front warning screen 410 (referring to FIG. 4A). On the other hand, when the magnitude θp of the PedW angle is larger than the threshold angle θ1$th$, the control device determines that the PedW candidate which has been determined as the warning object is present in one of the side areas of the own vehicle SV to display the side warning screen 420 (referring to FIGS. 4B and 4C).

(B) When the CTA_TTC is shorter than the Ped_TTC (i.e., the PedW_TTC is longer than the CTA_TTC), the control device determines the CTA candidate as the warning object, and displays the warning screen which guides the driver's eyes only to the direction of the CTA candidate.

As described above, the probability that the CTA candidate is present in one of the side areas of the own vehicle SV is high. However, the CTA candidate may be present in the front area of the own vehicle SV due to the detection error of the front side radar sensors 22L and 22R and/or the manufacturing error of the front side radar sensors 22L and 22R, for example, in the arrangement location and/or the arrangement angle. Therefore, the control device determines whether the CTA candidate is present in the front area or in one of the side areas of the own vehicle SV. More specifically, the control device calculates the magnitude of the warning angle of the CTA candidate θ (hereinafter, referred to as a "magnitude θc of the CTA angle"), and determines whether or not the magnitude θc of the CTA angle is equal to or smaller than the threshold angle θ1$th$.

When the magnitude θc of the CTA angle is equal to or smaller than the threshold angle θ1$th$, the control device determines that the CTA candidate which has been determined as the warning object is present in the front area of the own vehicle SV to display the front warning screen 410

(referring to FIG. 4A). On the other hand, when the magnitude θc of the CTA angle is larger than the threshold angle θ1th, the control device determines that the CTA candidate which has been determined as the warning object is present in one of the side areas of the own vehicle SV to display the side warning screen 420 (referring to FIGS. 4B and 4C).

(C) When the Ped_TTC is equal to the CTA_TTC, the control device selects one of the PedW candidate and the CTA candidate as the warning object, based on the locations of the PedW candidate and the CTA candidate in relation to the own vehicle SV. More specifically, the control device determines/specifies the warning object in accordance with priority order described in the following (1) through (3).

(1) When the PedW candidate is present in one of the side areas of the own vehicle SV, regardless of whether the CTA candidate is present in the front area or in one of the side areas of the own vehicle SV, the control device determines/designates the PedW candidate which is present in one of the side areas of the own vehicle SV as the warning object. In this case, the control device displays the side warning screen 420 which guides the driver's eyes to the direction of the PedW candidate.

(2) When the PedW candidate is present in the front area of the own vehicle SV and the CTA candidate is present in one of the side areas of the own vehicle SV, the control device determines/designates the CTA candidate which is present in one of the side areas of the own vehicle SV as the warning object. In this case, the control device displays the side warning screen 420 which guides the driver's eyes to the direction of the CTA candidate.

(3) When both the PedW candidate and the CTA candidate are present in the front area of the own vehicle SV, the control device determines/designates the PedW candidate as the warning object. In this case, the control device displays the front warning screen 410 which guides the driver's eyes to the direction of the PedW candidate.

Figure 5A:
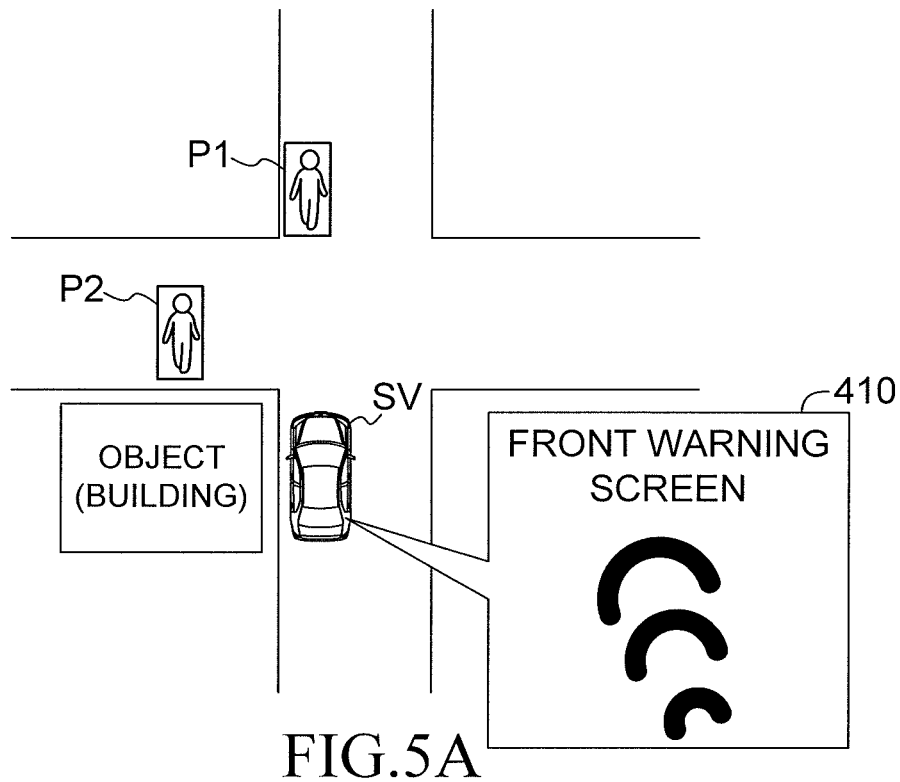
FIG. 5A is a diagram for illustrating one example of a location relationship between an own vehicle and obstacles detected in a front area and in a left side area when the front warning screen is displayed.

The operation of the control device will next be described with reference to an example illustrated in FIG. 5A. In the example, pedestrians P1 and P2 are present in relation to the own vehicle SV as illustrated in FIG. 5A. In the example, the following conditions are satisfied.

The pedestrian P1 is detected by the camera sensor 21 and the front radar sensor 22C. The pedestrian P2 is detected by the front side radar sensor 22L only.

Both the time to collision TTC of the pedestrian P1 and the time to collision of the pedestrian P2 are equal to or shorter than the threshold time period T1th.

The time to collision TTC of the pedestrian P1 is shorter than the time to collision TTC of the pedestrian P2.

The pedestrian P1 is present in the front area of the own vehicle SV.

The pedestrian P2 is present in the left side area of the own vehicle SV.

The PedW candidate selection ECU 40 selects the pedestrian P1 as the obstacle, and calculates the time to collision TTC of the pedestrian P1. The time to collision TTC of the pedestrian P1 is equal to or shorter than the threshold time period T1th. Therefore, the PedW candidate selection ECU 40 determines the pedestrian P1 as the PedW candidate, and transmits the PedW candidate information including the location information of the pedestrian P1 and the time to collision TIC of the pedestrian P1 to the warning ECU 10.

The CTA candidate selection ECU 50 selects the pedestrian P2 as the obstacle, and calculates the time to collision TIC of the pedestrian P2. The time to collision TTC of the pedestrian P2 is equal to or shorter than the threshold time period T1th. Therefore, the CTA candidate selection ECU 50 determines the pedestrian P2 as the CTA candidate, and transmits the CTA candidate information including the location information of the pedestrian P2 and the time to collision TTC of the pedestrian P2 to the warning ECU 10.

The warning ECU 10 obtains the PedW candidate information from the PedW candidate selection ECU 40 and the CTA candidate information from the CTA candidate selection ECU 50. The time to collision TTC (PedW_TTC) of the PedW candidate (the pedestrian P1) is shorter than the time to collision TTC (CTA_TTC) of the CTA candidate (the pedestrian P2). Therefore, the warning ECU 10 determines the PedW candidate as the warning object, similarly to the above case (A). The pedestrian P1 is present in the front area of the own vehicle SV. Therefore, the warning ECU 10 displays the front warning screen 410 which guides the driver's eyes to the direction of the pedestrian P1.

Figure 5B:
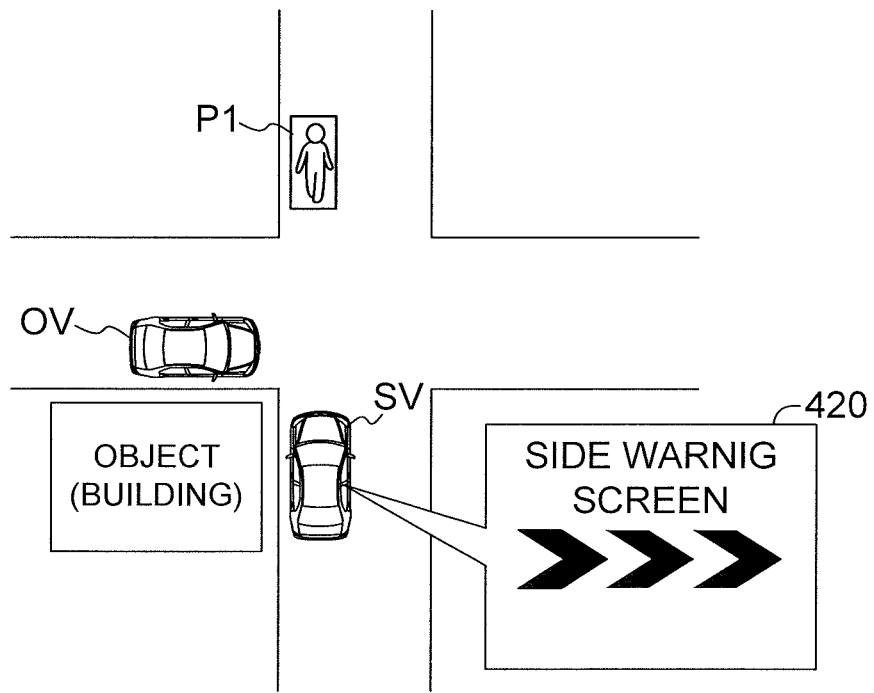
FIG. 5B is a diagram for illustrating one example of a location relationship between an own vehicle and obstacles detected in a front area and in a left side area when the side warning screen is displayed.

The operation of the control device will be described with reference to an example illustrated in FIG. 5B. In the example, a pedestrian P1 and other vehicle OV are present in relation to the own vehicle SV as illustrated in FIG. 5B. In the example illustrated in FIG. 5B, the following conditions are satisfied.

The pedestrian P1 is detected by the camera sensor 21 and the front radar sensor 22C. The other vehicle OV is detected by the front side radar sensor 22L only.

Both the time to collision TTC of the pedestrian P1 and the time to collision of the other vehicle OV are equal to or shorter than the threshold time period T1th.

The time to collision TTC of the other vehicle OV is shorter than the time to collision TTC of the pedestrian P1.

The pedestrian P1 is present in the front area of the own vehicle SV.

The other vehicle OV is present in the left side area of the own vehicle SV.

The PedW candidate selection ECU 40 selects the pedestrian P1 as the obstacle, and calculates the time to collision TTC of the pedestrian P1. The time to collision TTC of the pedestrian P1 is equal to or shorter than the threshold time period T1th. Therefore, the PedW candidate selection ECU 40 determines the pedestrian P1 as the PedW candidate, and transmits the PedW candidate information including the location information of the pedestrian P1 and the time to collision TTC of the pedestrian P1 to the warning ECU 10.

The CTA candidate selection ECU 50 selects the other vehicle OV as the obstacle, and calculates the time to collision TTC of the other vehicle OV. The time to collision TTC of other vehicle OV is equal to or shorter than the threshold time period T1th. Therefore, the CTA candidate selection ECU 50 determines the other vehicle OV as the CTA candidate, and transmits the CTA candidate information including the location information of the other vehicle OV and the time to collision TTC of the other vehicle OV to the warning ECU 10.

The warning ECU 10 obtains the PedW candidate information from the PedW candidate selection ECU 40 and the CTA candidate information from the CTA candidate selection ECU 50. The time to collision TIC (CTA_TTC) of the CTA candidate (the other vehicle OV) is shorter than the time to collision TTC (PedW_TTC) of the PedW candidate (the pedestrian P1). Therefore, the warning ECU 10 determines the CTA candidate as the warning object, similarly to the above case (B). The other vehicle OV is present in the left side area of the own vehicle SV. Therefore, the warning ECU 10 displays the side warning screen 420 which guides the driver's eyes to the direction of the other vehicle OV.

<Specific Operation>

A routine executed by the CPU 41 of the PedW candidate selection ECU 40 will next be described with reference to FIG. 6.

Figure 6:
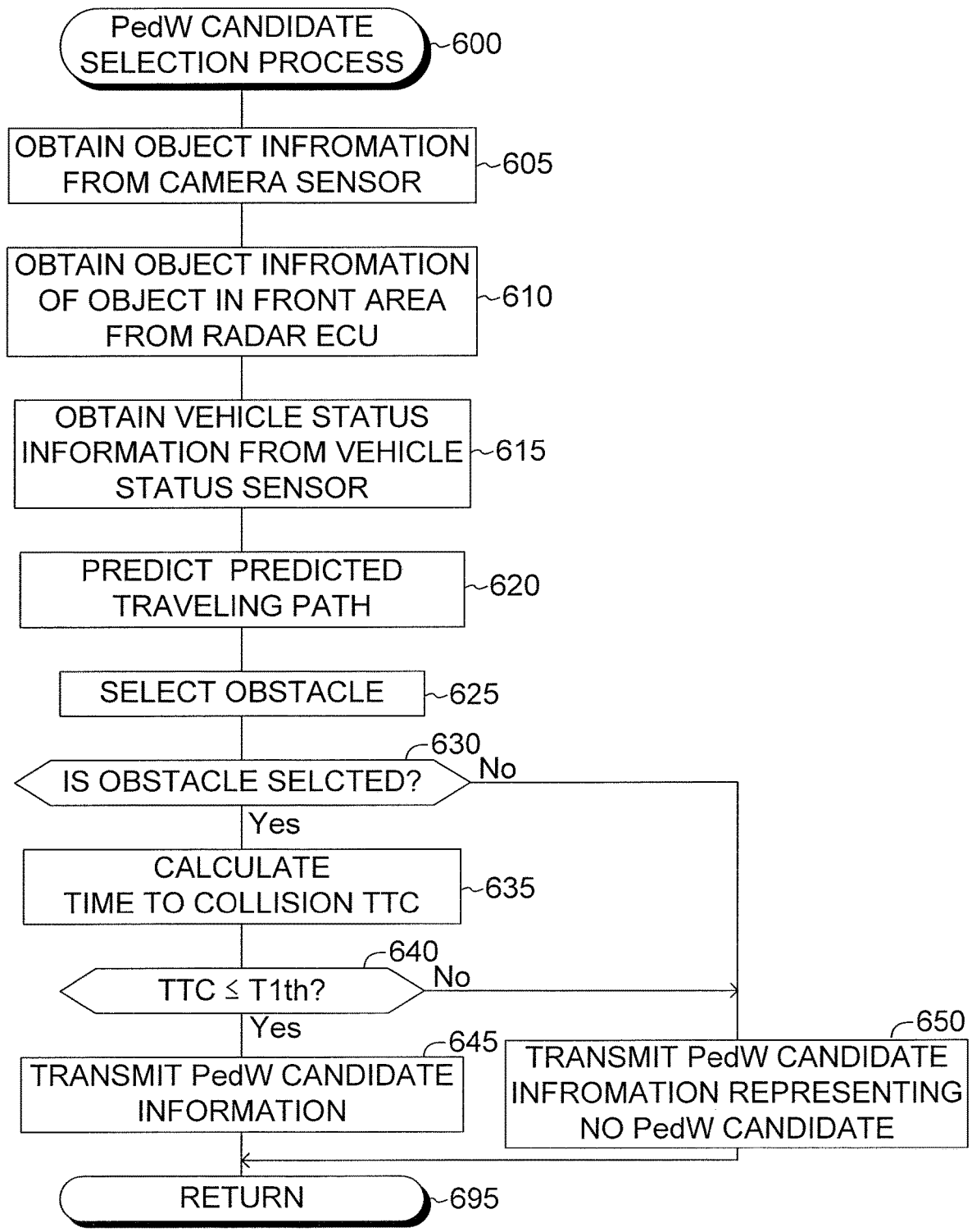
FIG. 6 is a flowchart for illustrating a routine which is executed by a CPU of a PedW candidate selection ECU illustrated in FIG. 1.

The CPU 41 of the PedW candidate selection ECU 40 executes the routine represented by a flowchart in FIG. 6, every time a predetermined time period elapses. The routine shown in FIG. 6 is a routine for selecting the pedestrian (PedW candidate) to which the driver should be made to pay attention among the at least one pedestrian (obstacle) which is present in the front area or the side areas of the own vehicle SV and which has high probability of colliding with the own vehicle SV.

When a predetermined timing has come, the CPU 41 starts the process from Step 600 of FIG. 6, executes the following processes of Steps 605 through 625 in these order, and proceeds to Step 630.

Step 605: The CPU 41 obtains the object information from the camera sensor 21.

Step 610: The CPU 41 obtains, from the radar ECU 30, the object information of the object which is detected based on the transmitted and received data sent from the front radar sensor 22C.

Step 615: The CPU 41 obtains the vehicle status information from the vehicle status sensor 23.

Step 620: The CPU 41 predicts a predicted traveling path RCR which represents a path (course) along which the own vehicle SV will move, based on the vehicle status information obtained at Step 615.

A detail of Step 620 will next be described. The CPU 41 calculates a turning radius of the own vehicle SV based on the velocity of the own vehicle SV detected by the vehicle velocity sensor and the yaw rate detected by the yaw rate sensor. The vehicle status information includes the velocity and the yaw rate of the own vehicle SV.

Thereafter, the CPU 41 predicts, as the predicted traveling path RCR, a traveling path along which a center point in the width direction of the own vehicle SV (the center point of a wheel axis connecting a left wheel and a right wheel) will move. When magnitude of the yaw rate is larger than "0", a shape of the predicted traveling path RCR is an arc. When the magnitude of the yaw rate is "0", the CPU 41 predicts a strait traveling path along a direction of the acceleration detected by the acceleration sensor as the traveling path along which the own vehicle SV will move (i.e. the predicted traveling path RCR). The CPU 41 recognizes (determines), as the predicted traveling path RCR, a part of the traveling path having a finite distance from a present location of the own vehicle to a location where the own vehicle will move for a predetermined distance/length from the present location along the traveling path, regardless of whether the own vehicle is running straight or turning.

Step 625: The CPU 41 selects, as the obstacle(s), the pedestrian(s) which has (have) high probability of colliding with the own vehicle SV, based on the object information obtained at Step 605, the object information obtained at Step 610, and the predicted traveling path RCR predicted at Step 620. The selected obstacle may include an object which is predicted not to collide with the own vehicle SV but to have a narrow margin of clearance between the object and the own vehicle SV (or to extremely approach the own vehicle SV).

A detail of Step 625 will next be described with reference to FIG. 3. The CPU 41 predicts, based on the "predicted traveling path RCR" having the finite distance, an predicted left traveling path LEC along which a point PL will move, and an predicted right traveling path REC along which a point PR will move. The point PL is a point positioned leftward by a predetermined distance αL from a left end of a body of the own vehicle SV. The point PR is a point positioned rightward by a predetermined distance αR from a right end of the body of the own vehicle SV. That is, the predicted left traveling path LEC is a path obtained by a parallel shift of the predicted traveling path RCR in the left direction of the own vehicle SV by a "distance obtained by adding a half (W/2) of a vehicle-body width W to the predetermined distance αL". The predicted right traveling path REC is a path obtained by a parallel shift of the predicted traveling path RCR in the right direction of the own vehicle SV by a "distance obtained by adding a half (W/2) of the vehicle-body width W to the predetermined distance αR". Each of the distance αL and the distance αR is a distance which is longer than or equal to "0". The distance αL and the distance αR may be the same as each other, or may be different from each other. The CPU 41 specifies/designates, as a predicted traveling path area ECA, an area between the predicted left traveling path LEC and the predicted right traveling path REC.

The CPU 41 identifies a location of each pedestrian based on the position of each pedestrian which is represented by the "object information obtained from the camera sensor 21 at Step 605" and the position of each object which is represented by the "object information obtained from the radar ECU 30 at Step 610". Thereafter, the CPU 41 calculates/predicts a moving trajectory of each pedestrian based on the past locations of each pedestrian which have been identified. Then, the CPU 41 calculates/predicts a moving direction of each pedestrian in relation to the own vehicle SV based on the calculated moving trajectory of each pedestrian.

Subsequently, the CPU 41 selects/extracts, as the pedestrian (obstacle) which has high probability of colliding with the own vehicle SV, one or more of pedestrians which has (have) been in the predicted traveling path area ECA (refer to FIG. 3) and which will intersect with a front end area TA of the own vehicle SV, and one or more pedestrians which will be in the predicted traveling path area ECA and which will intersect with the front end area TA of the own vehicle SV, based on the predicted traveling path area ECA (refer to FIG. 3), the relative relation (the relative location and a relative velocity) between the own vehicle SV and the pedestrian, and the moving direction of the pedestrian in relation to the own vehicle SV. The front end area TA is an area represented by a line segment between the point PL and the point PR.

The CPU 41 predicts, as the predicted left traveling path LEC, the "trajectory/path along which the point PL will move", and predicts, as the predicted right traveling path REC, the "trajectory/path along which the point PR will move". Thus, the "pedestrian which has been in the predicted traveling path area ECA and will intersect with the front end area TA of the own vehicle SV" may include a pedestrian which is likely to pass near the left side or the right side of the own vehicle SV, and the "pedestrian which will be in the predicted traveling path area ECA and will intersect with the front end area TA of the own vehicle SV" may include a pedestrian which is likely to pass near the left side or the right side of the own vehicle SV. Accordingly, the CPU 41 can select/extract, as the obstacle, the pedestrian which has probability of passing near the left side or the right side of the own vehicle SV.

After executing Step 625, the CPU 41 proceeds to Step 630, and determines whether or not at least one obstacle has been selected at Step 625. When the obstacle has been selected at Step 625, the CPU makes a "Yes" determination at Step 630, and proceeds Step 635.

At Step 635, the CPU 41 calculates the time to collision TTC of each of the obstacles selected at Step 625.

A detail of Step 635 will next be described.

The CPU 41 obtains the time to collision TTC of the pedestrian by dividing the distance (the relative length) between the own vehicle SV and the pedestrian by the relative velocity of the pedestrian in relation to the own vehicle SV.

The time to collision TTC is either one of a time period T1 or a time period T2, described below.

The time period T1 is a time (period) which it takes for the pedestrian to collide with the own vehicle SV (a time period from the present time point to a predicted collision estimation time point).

The time period T2 is a time (period) which it takes for the pedestrian which has high probability of passing near either side of the own vehicle SV to reach the closest point to the own vehicle SV (a time period from the present time point to the time point at which the own vehicle SV most closely approaches the pedestrian).

The time to collision TTC is a time which it takes for the pedestrian to reach the "front end area TA of the own vehicle SV" under an assumption that the pedestrian and the own vehicle SV move while keeping the relative velocity and the relative moving direction at the present time period.

After calculating the time to collision TTC at Step 635, the CPU 41 proceeds to Step 640. At Step 640, the CPU 41 determines whether or not the time to collision TTC calculated at Step 635 is equal to or shorter than the predetermined threshold time period T1$th$. If a plurality of the pedestrians have been selected as the obstacles at Step 625, the CPU 41 determines whether or not the time to collision TTC which is shortest/minimum among those of a plurality of the obstacles is equal to or shorter than the threshold time period T1$th$ at Step 640.

When the (shortest) time to collision TTC is equal to or shorter than the threshold time period T1$th$, the CPU 41 makes a "Yes" determination at Step 640, and proceeds to Step 645. At Step 645, the CPU 41 determines, as the PedW candidate, the pedestrian (obstacle) whose time to collision TTC is equal to or shorter than the threshold time period T1$th$ and whose time to collision TTC is the shortest in the obstacle(s) selected at Step 625. Thereafter, at Step 645, the CPU 41 transmits the PedW candidate information including the location information and the time to collision of the pedestrian (PedW candidate) to the warning ECU 10, and proceeds to Step 695 to tentatively terminate the present routine.

When no obstacle has been selected at Step 625, the CPU 41 makes a "No" determination at Step 630, and proceeds to Step 650. Furthermore, when all of the time to collision TTC of all of the obstacles selected at Step 625 are longer than the threshold time period T1$th$ at the time of executing the process at Step 640, the CPU 41 makes a "No" determination at Step 640, and proceeds to Step 650. At Step 650, the CPU 41 transmits the PedW candidate information representing that there is no PedW candidate to the warning ECU 10, and proceeds to Step 695 to tentatively terminate the present routine.

A routine executed by the CPU 51 of the CTA candidate selection ECU 50 will next be described with reference to FIG. 7.

Figure 7:
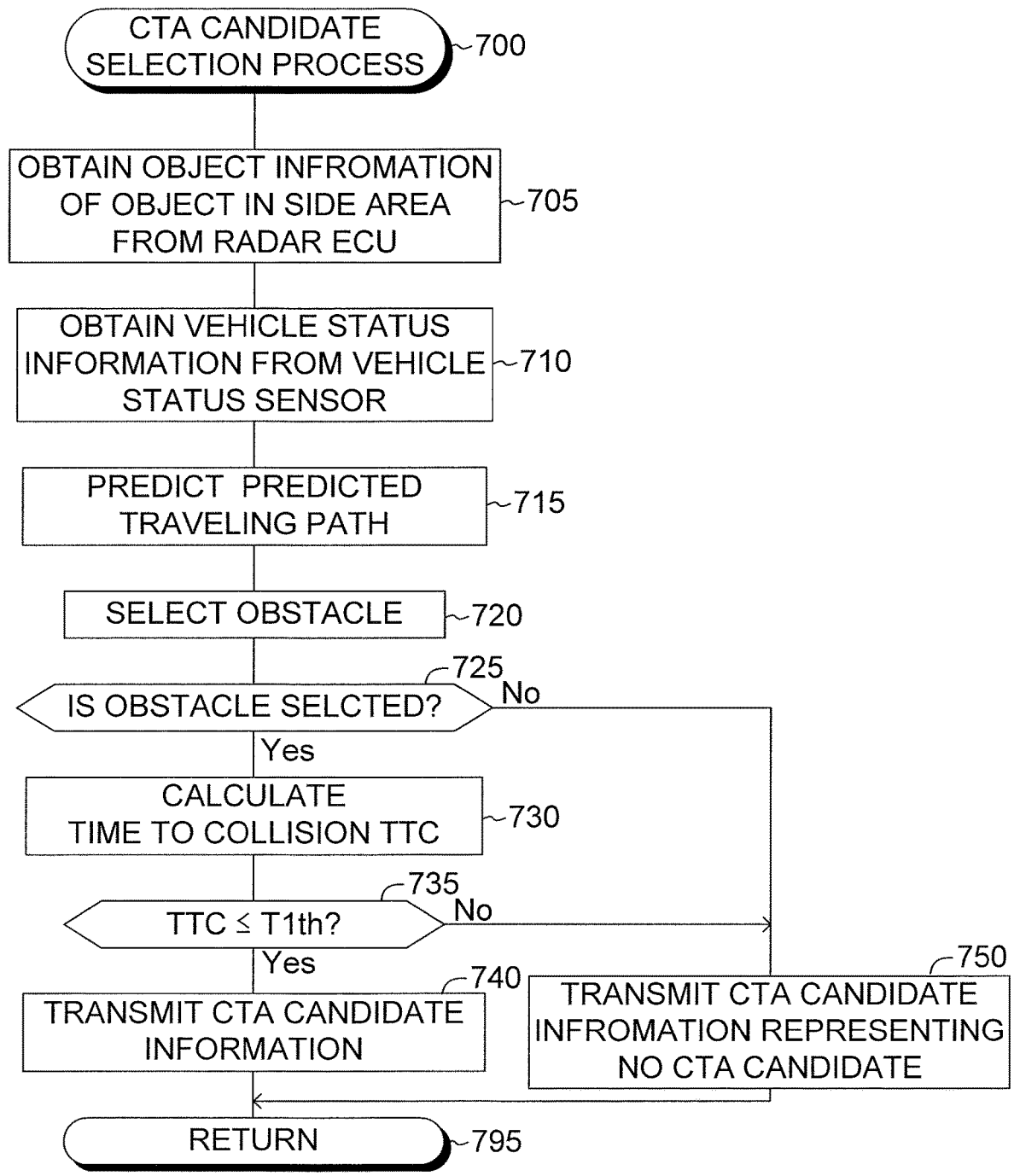
FIG. 7 is a flowchart for illustrating a routine which is executed by a CPU of a CTA candidate selection ECU illustrated in FIG. 1.

The CPU 51 of the CTA candidate selection ECU 50 executes the routine represented by a flowchart shown in FIG. 7, every time the predetermined time period elapses. The routine represented in FIG. 7 is a routine for selecting the object (CTA candidate) to which the driver should be made to pay attention among the object(s) (obstacle(s)) which is present in the side areas of the own vehicle SV mainly and which has high probability of colliding with the own vehicle SV.

When a predetermined timing has come, the CPU 51 starts the process from Step 700 of FIG. 7, executes the following processes of Steps 705 through 720 in these order, and proceeds to Step 725.

Step 705: The CPU 51 obtains, from the radar ECU 30, the object information of the object(s) which is detected based on the transmitted and received data sent from the front side radar sensor 22L and the object information of the object(s) which is detected based on the transmitted and received data sent from the front side radar sensor 22R.

Step 710: The CPU 51 obtains the vehicle status information from the vehicle status sensor 23.

Step 715: The CPU 51 predicts the predicted traveling path RCR of the own vehicle SV based on the vehicle status information obtained at Step 615.

Step 720: The CPU 51 selects the obstacle(s) from the object(s) which is (are) represented by the object information obtained at Step 705 based on the object information obtained at Step 705 and the predicted traveling path RCR predicted at Step 715. A detail of the process of selecting the obstacle(s) at Step 720 is similar to the process at Step 625. Therefore, such detail explanation of the process at Step 720 is omitted.

After executing the Step 720, the CPU 51 proceeds to Step 725. At Step 725, the CPU 51 determines whether or not the obstacle(s) has been selected at Step 720. When the at least one obstacle has been selected at Step 720, the CPU 51 makes a "Yes" determination at Step 725, and proceeds to Step 730.

At Step 730, the CPU 51 calculates the time to collision TTC of each of the obstacle(s) selected at Step 720, and proceeds to Step 735. A detail of the process of calculating the time to collision TTC at Step 730 is similar to the process at Step 635. Therefore, a detail explanation of the process at Step 730 is omitted. If a plurality of the obstacles have been selected at Step 720, the CPU 51 determines whether or not the shortest time to collision TTC in a plurality of the obstacles is equal to or shorter than the threshold time period T1$th$ at Step 735.

When the time to collision TTC is equal to or shorter than the threshold time period T1$th$, the CPU 51 makes a "Yes" determination at Step 735, and proceeds to Step 740. At Step 740, the CPU 51 determines, as the CTA candidate, the obstacle whose time to collision TTC is equal to or shorter than the threshold time period T1$th$ and whose time to collision TTC is the shortest in the obstacle(s) selected at Step 720. Thereafter, at Step 740, the CPU 51 transmits the CTA candidate information including the location information and the time to collision of the obstacle (CTA candidate) to the warning ECU 10, and proceeds to Step 795 to tentatively terminate the present routine.

When no obstacle has been selected at Step 720, the CPU 51 makes a "No" determination at Step 725, and proceeds to Step 745. Furthermore, when all of the time to collision TTC of all of the obstacles selected at Step 720 are longer than the threshold time period T1$th$ at the time of executing the process at Step 735, the CPU 51 makes a "No" determination at Step 735, and proceed to Step 745. At Step 745, the CPU 51 transmits the CTA candidate information representing that there is no CTA candidate to the warning ECU 10, and proceeds to Step 795 to tentatively terminate the present routine.

A routine executed by the CPU 11 of the warning ECU 10 will next be described with reference to FIGS. 8A and 8B.

Figure 8A:
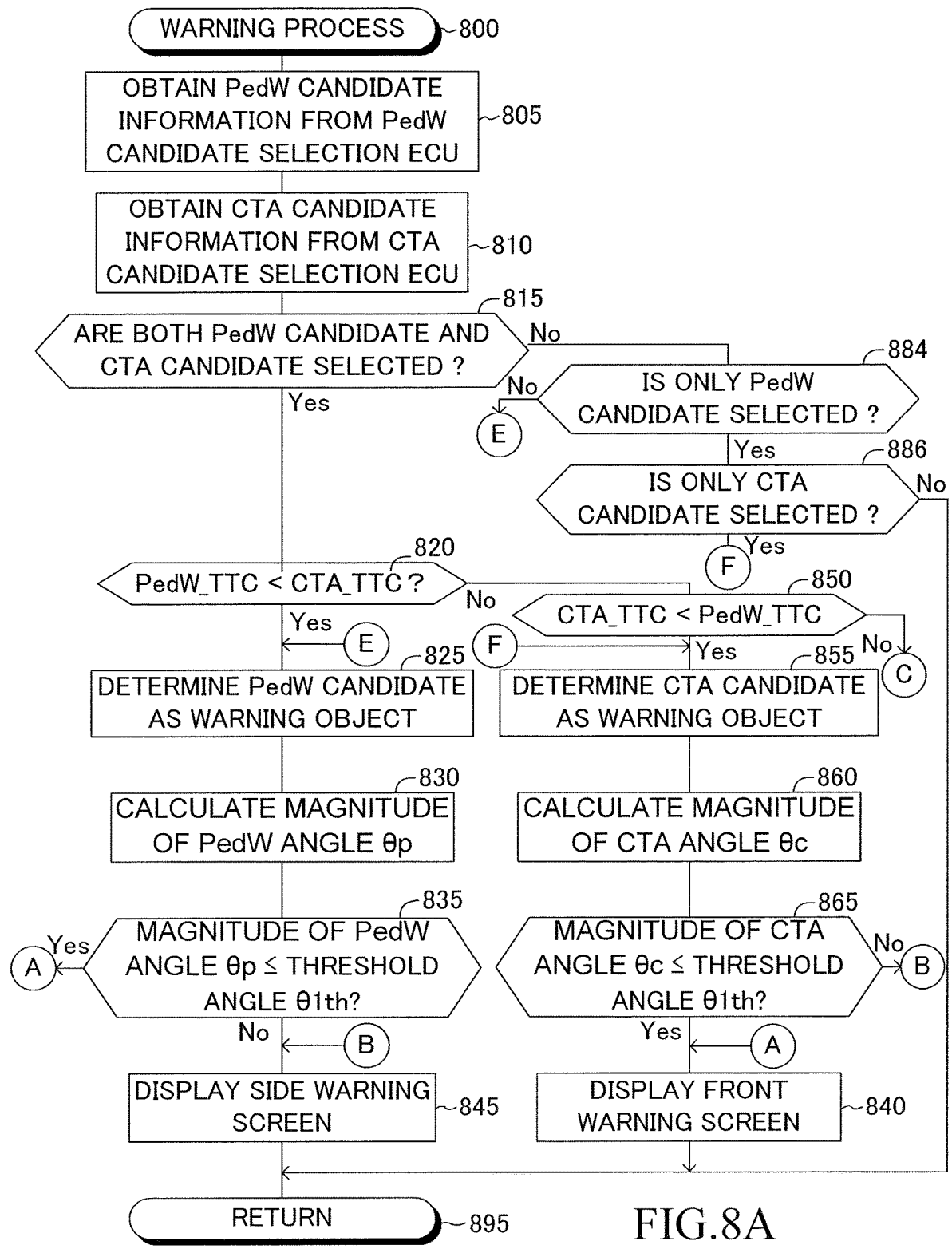
FIG. 8A is a flowchart for illustrating a routine which is executed by a CPU of a warning ECU illustrated in FIG. 1.
Figure 8B:
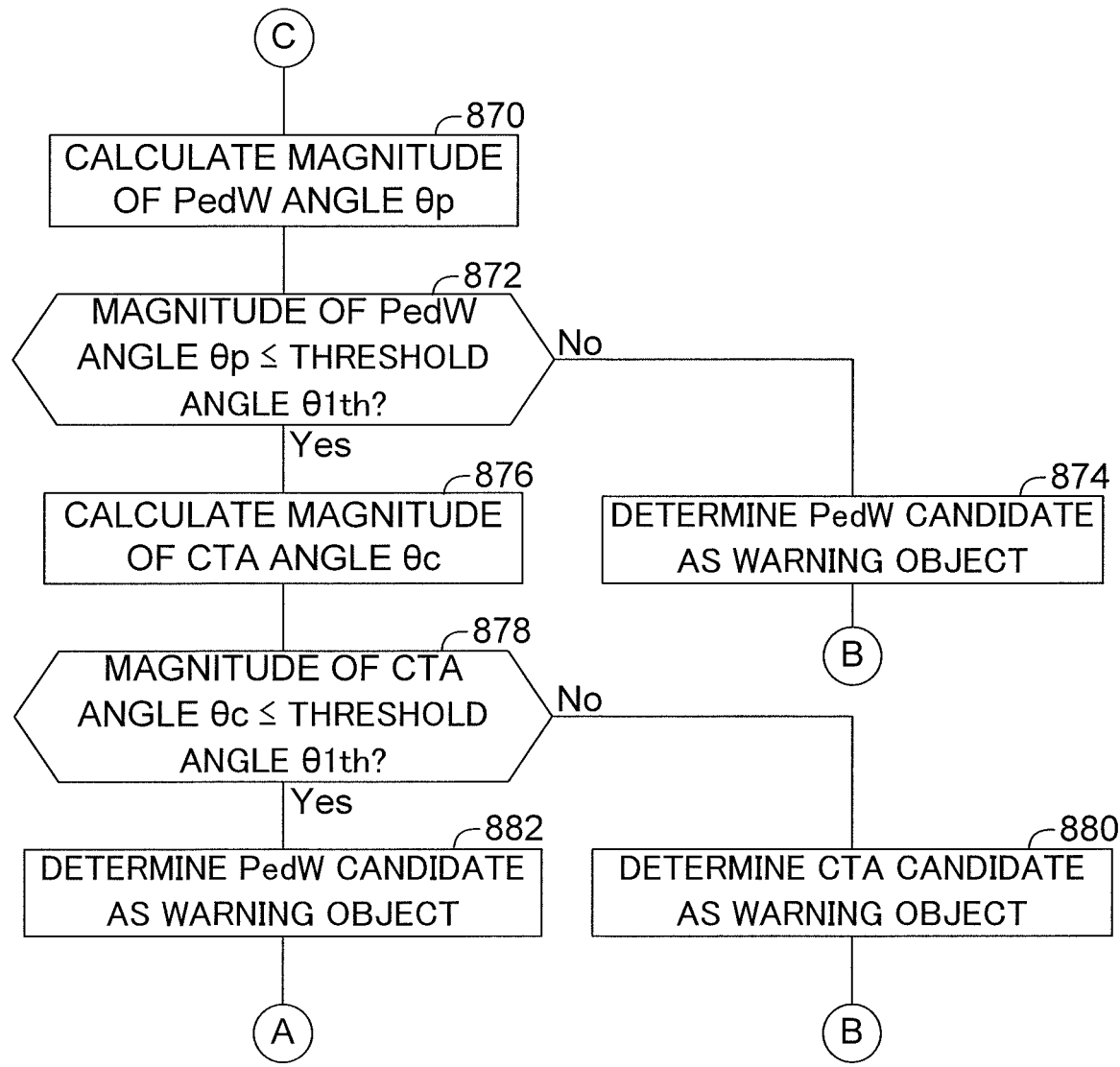
FIG. 8B is a flowchart for illustrating the routine which is executed by the CPU of the warning ECU illustrated in FIG. 1.

The CPU 11 of the warning ECU 10 executes the routine represented by flowcharts shown in FIGS. 8A and 8B, every time the predetermined time period elapses. The routine represented in FIGS. 8A and 8B is a routine for displaying the warning screen to warn the driver of the warning object.

When a predetermined timing has come, the CPU 11 starts the process from Step 800 of FIG. 8, executes the following processes of Steps 805 and 810 in these order, and proceeds to Step 815.

Step 805: The CPU 11 obtains the PedW candidate information from the PedW candidate ECU 40.

Step 810: The CPU 11 obtains the CTA candidate information from the CTA candidate ECU 50.

Step 815: The CPU 11 determines whether or not both of the PedW candidate and the CTA candidate have been extracted/selected, based on the PedW candidate information obtained at Step 805 and the CTA candidate information obtained at Step 810. More specifically, when the PedW candidate information includes the location information and the time to collision of the PedW candidate and the CTA candidate information includes the location information and the time to collision of the CTA candidate, the CPU 11 determines that both of the PedW candidate and the CTA candidate have been extracted/selected.

When both of the PedW candidate and the CTA candidate have been extracted/selected, the CPU 11 makes a "Yes" determination at Step 815 to proceed to Step 820. At Step 820, the CPU 11 determines whether or not the time to collision TTC of the PedW candidate (PedW_TTC) is shorter than the time to collision TTC of the CTA candidate (CTA_TTC). The PedW candidate information includes the PedW_TTC, and the CTA candidate information includes the CTA_TTC.

When the PedW_TTC is shorter than the CTA_TTC, the CPU 11 makes a "Yes" determination at Step 820, and proceeds to Step 825 to determine/designates the PedW candidate as the warning object. Thereafter, the CPU 11 proceeds to Step 830 to calculate the magnitude Op of the PedW angle based on the location of the PedW candidate as described above, and proceeds to Step 835.

At Step 835, the CPU 11 determines whether or not the magnitude θp of the PedW angle is equal to or smaller than the threshold angle θ1$th$. When the magnitude θp of the PedW angle is equal to or smaller than the threshold angle θ1$th$, the CPU 11 determines that the PedW candidate which has been determined/designated as the warning object is present in the front area of the own vehicle SV to make a "Yes" determination at Step 835. Thereafter, the CPU 11 proceeds to Step 840 to display the front warning screen 410 which guides the driver's eyes to the direction of the PedW candidate which is present in the front area of the own vehicle SV.

At Step 840, the CPU 11 transmits, to the display unit 60, a front display command to have the display unit 60 display the front warning screen 410, and proceeds to Step 895 to tentatively terminate the present routine. The front display command includes the location information of the PedW candidate which has been determined/designated as the warning object.

When the display unit 60 receives the front display command, the display unit 60 displays the front warning screen 410 including the front eyes guidance icon 411 which guides the driver's eyes to the direction of the location represented by the location information of the PedW candidate which is included in the received front display command (for example, referring to FIG. 4A).

In the example illustrated in FIG. 4A, the front eyes guidance icon 411 indicates/represents a direction of 18 deg to the left/counterclockwise direction of the center line in the display area so as to indicate that the pedestrian which is the PedW candidate is present in that direction (so as to notify the driver of the direction of the pedestrian which is the PedW candidate). The driver's eyes are guided to the direction which the front eyes guidance icon 411 indicates/represents so that the driver can pay attention to the "pedestrian which is the PedW candidate and is present in the front area of the own vehicle SV".

Referring back to FIG. 8A, the routine executed by the CPU 11 of the warning ECU 10 is continued to be described. When the magnitude Op of the PedW angle is larger than the threshold angle θ1$th$ at the time of executing the process at Step 835, the CPU 11 determines that the PedW candidate which has been determined/designated as the warning object is present in the one of the side areas of the own vehicle SV to make a "No" determination at Step 830. Then the CPU 11 proceeds to Step 845 to display the side warning screen 420 which guides the driver's eyes to the direction of the PedW candidate which is present in one of the side areas of the own vehicle SV.

At Step 845, the CPU 11 transmits a side display command to have the display unit 60 display the side warning screen 420 to the display unit 60, and proceeds to Step 895 to tentatively terminate the present routine. The side display command includes the location information of the PedW candidate determined/designated as the warning object.

When the display unit 60 receives the side display command, the display unit 60 displays the side warning screen 420 including the side eyes guidance icon 421 (for example, referring to FIGS. 4B and 4C) which guides the driver's eyes to the direction of the location represented by the location information of the PedW candidate which is included in the received side display command. In the example illustrated in FIG. 4B, the side eyes guidance icon 421 indicates/represents a direction of 90 deg to the left/counterclockwise direction of the center line in the display area so as to indicate that the pedestrian which is the PedW candidate is present in that direction (so as to notify the driver of the direction of the pedestrian which is the PedW candidate). In the example illustrated in FIG. 4C, the side eyes guidance icon 421 indicates/represents a direction of 90 deg to the right/clockwise direction of the center line in the display area so as to indicate that the pedestrian which is the PedW candidate is present in that direction (so as to notify the driver of the direction of the pedestrian which is the PedW candidate). The driver's eyes are guided to the direction which the side eyes guidance icon 421 indicates/represents so that the driver can pay attention to the "pedestrian which is the PedW candidate and is present in the side area of the own vehicle SV".

On the other hand, when the PedW_TTC is equal to or longer than the CTA_TTC (in other words, the CTA_TTC is equal to or shorter than the PedW_TTC) at the time of executing the process at Step 820, the CPU 11 makes a "No" determination at Step 820 to proceed to Step 850. At Step 850, the CPU 11 determines whether or not the CTA_TTC is shorter than the PedW_TTC.

When the CTA_TTC is shorter than the PedW_TTC, the CPU 11 makes a "Yes" determination at Step 850, and proceeds to Step 855 to determine/designates the CTA candidate as the warning object. Thereafter, the CPU 11 proceeds to Step 860 to calculate, as the magnitude (θc) of the CTA angle, the magnitude of the angle at the predetermined location DP formed between the line which passes through the CTA candidate and the predetermined location DP and the base line BL, and proceeds to Step 865.

At Step 865, the CPU 11 determines whether or not the magnitude θc of the CTA angle is equal to or smaller than the threshold angle θ1*th*. When the magnitude θc of the CTA angle is equal to or smaller than the threshold angle θ1*th*, the CPU 11 determines that the CTA candidate determined/designated as the warning object is present in the front area of the own vehicle SV so as to make a "Yes" determination at Step 865. Then, the CPU 11 proceeds to Step 840 to display the front warning screen 410 which guides the driver's eyes to the direction of the CTA candidate which is present in the front area of the own vehicle SV.

At Step 840, the CPU 11 transmits, to the display unit 60, the front display command including the location information of the CTA candidate determined/designated as the warning object, and proceeds to Step 895 to tentatively terminate the present routine. When the display unit 60 receives the front display command, the display unit 60 displays the front warning screen 410 (for example, referring to FIG. 4A).

On the other hand, when the magnitude θc of the CTA angle is larger than the threshold angle θ1*th*, the CPU 11 determines that the CTA candidate determined/designated as the warning object is present in one of the side areas of the own vehicle SV so as to make a "No" determination at Step 865. Then, the CPU 11 proceeds to Step 845 to display the side warning screen 420 which guides the driver's eyes to the direction of the CTA candidate which is present in one of the side areas of the own vehicle SV.

At Step 845, the CPU 11 transmits, to the display unit 60, the side display command including the location information of the CTA candidate determined/designated as the warning object, and proceeds to Step 895 to tentatively terminate the present routine. When the display unit 60 receives the side display command, the display unit 60 displays the side warning screen 420 (for example, referring to FIGS. 4B and 4C).

As described above, when both the PedW candidate and the CTA candidate have been extracted/selected, the warning screen which guides the driver's eyes to the direction of one candidate with the shortest time to collision TTC from the PedW candidate and the CTA candidate, is displayed. This can prevent the driver's eyes from being guided to a plurality of the directions at the same time so as to prevent the driver from getting confused. Furthermore, the driver's eyes are guided to one candidate with the shortest time to collision TTC from the PedW candidate and the CTA candidate. Therefore, the driver's eyes are guided to one candidate with the shortest time till the collision with the own vehicle SV from the PedW candidate and the CTA candidate. Accordingly, the driver can be warned/alerted appropriately.

On the other hand, when the PedW_TTC is equal to the CTA_TTC at the time of executing the process at Step 850, the CPU 11 makes a "No" determination at Step 850, and proceeds to Step 870 shown in FIG. 8B. When the PedW_TTC is equal to the CTA_TTC, the CPU 11 cannot select/designate one of the PedW candidate and the CTA candidate as the warning object based on their times to collision TTC. Therefore, in processes after Step 870, the CPU 11 select/designate one of the PedW candidate and the CTA candidate as the warning object based on locations of the PedW candidate and the CTA candidate in accordance with the priority order (1) through (3) described above.

First, at Step 870 shown in FIG. 8B, the CPU 11 calculates the magnitude θp of the PedW angle similarly to Step 830, and proceeds to Step 872 shown in FIG. 8B. At Step 872, similarly to Step 835 shown in FIG. 8A, the CPU 11 determines whether or not the magnitude θp of the PedW angle is equal to or smaller than the threshold angle θ1*th*. When the magnitude θp of the PedW angle is larger than the threshold angle θ1*th*, in other words, when the PedW candidate is present in one of the side areas of the own vehicle SV, the above described (1) is established. Therefore, the CPU 11 makes a "No" determination at Step 872 shown in FIG. 8B, and proceeds to Step 874. At Step 874, the CPU 11 determines/designates the PedW candidate which is present in one of the side areas of the own vehicle SV as the warning object, and proceeds to Step 845 shown in FIG. 8A. At Step 845, the CPU 11 transmits, to the display unit 60, the side display command which includes the location information of the PedW candidate determined/designated as the warning object, and proceeds to Step 895 to tentatively terminate the present routine. As a result, the side warning screen 420 which guides the driver's eyes to the direction of the PedW candidate which is present in one of the side areas of the own vehicle SV is displayed.

On the other hand, when the magnitude θp of the PedW angel is equal to or smaller than the threshold angle θ1*th*, in other words, when the PedW candidate is present in the front area of the own vehicle SV, the CPU 11 makes a "Yes" determination at Step 872 shown in FIG. 8B, and proceeds to Step 876. At Step 876, the CPU 11 calculates the magnitude θc of the CTA angle, similarly to Step 860 shown in FIG. 8A.

Thereafter, at Step 878 shown in FIG. 8B, the CPU determines whether or not the magnitude θc of the CTA angle is equal to or smaller than the threshold angle θ1*th*, similarly to Step 865 shown in FIG. 8A. When the magnitude θc of the CTA angle is larger than the threshold angle θ1*th*, the PedW is present in the front area of the own vehicle SV and the CTA candidate is present in one of the side areas of the own vehicle SV. Therefore, the above described (2) is established. Thus, the CPU 11 makes a "No" determination at Step 878, and proceeds to Step 880 shown in FIG. 8B. At Step 880, the CPU 11 determines/designates the CTA which is present in one of the side areas of the own vehicle SV as the warning object, and proceeds to Step 845 shown in FIG. 8A. At Step 845, the CPU 11 transmits, to the display unit 60, the side display command which includes the location information of the CTA candidate determined/designated as the warning object, and proceeds to Step 895 to tentatively terminate the present routine. As a result, the side warning screen 420 which guides the driver's eyes to the direction of the CTA candidate which is present in one of the side areas of the own vehicle SV is displayed.

On the other hand, when the magnitude θc of the CTA angle is equal to or smaller than the threshold angle θ1*th*, both the PedW candidate and the CTA candidate are present in the front area of the own vehicle SV. Therefore, the above described (3) is established. Accordingly, the CPU 11 makes a "Yes" determination at Step 878 shown in FIG. 8B, and proceeds to Step 882. At Step 882, the CPU 11 determines/designates the PedW candidate which is present in the front area of the own vehicle SV as the warning object, and proceeds to Step 840 shown in FIG. 8A. At Step 840, the CPU 11 transmits, to the display unit 60, the front display command which includes the location information of the PedW candidate determined/designated as the waning object, and proceeds to Step 895 to tentatively terminate the present routine. As a result, the front warning screen 410 which guides the driver's eyes to the direction of the PedW candidate which is present in the front area of the own vehicle SV is displayed.

Generally, it tends to be more difficult for the driver to notice the object which is present in one of the side areas of the own vehicle SV than to notice the object which is present in the front area of the own vehicle SV. Further, the PedW candidate is the pedestrian. It tends to be more difficult for the driver to notice the pedestrian than to notice other vehicles. Therefore, in a case where the PedW_TTC is equal to the CTA_TTC, when the above described (1) is established, in other words, when the PedW candidate is present in one of the side areas of the own vehicle SV, the PedW candidate tends to be the most difficult to be noticed by the driver regardless of the location of the CTA candidate. Therefore, at Step 874 shown in FIG. 8B, the PedW candidate which is present in one of the side areas of the own vehicle SV is determined/designated as the warning object. As a result, when the above described (1) is established, the driver's eyes can be guided on a priority basis (preferentially) to the direction of the pedestrian which is present in one of the side areas of the own vehicle SV and which tends to be the most difficult to be noticed by the driver.

Furthermore, it is likely that the driver's sight does not cover the object which is present in one of the side areas of the own vehicle SV. Therefore, it tends to be more difficult for the driver to notice the object (3D object) which is present in one of the side areas of the own vehicle SV than to notice the pedestrian which is present in the front area. Therefore, in a case where the PedW_TTC is equal to the CTA_TTC, when the above described (2) is established, in other words, when the PedW candidate is present in the front area of the own vehicle SV and the CTA candidate is present in one of the side areas of the own vehicle SV, it is likely that it is more difficult for the driver to notice the CTA candidate than to notice the PedW candidate. Accordingly, at Step 880 shown in FIG. 8B, the CTA candidate which is present in one of the side areas of the own vehicle SV is determined/designated as the warning object. Therefore, when the above described (2) is established, the driver's eyes can be guided on a priority basis (preferentially) to the direction of the obstacle (the CTA candidate) which is present in one of the side areas of the own vehicle SV and which tends to be difficult to be noticed by the driver.

In a case where the PedW_TTC is equal to the CTA_TTC, when the above described (3) is established, in other words, when both of the PedW candidate and the CTA candidate are present in the front area of the own vehicle SV, it is likely that it is more difficult for the driver to notice the PedW candidate than to notice the CTA candidate. Therefore, at Step 882 shown in FIG. 8B, the PedW candidate which is present in the front area of the own vehicle SV is determined/designated as the warning object. As a result, when the above described (3) is established, the driver's eyes can be guided on a priority basis (preferentially) to the direction of the pedestrian which tends to be difficult to be notice by the driver.

As described above, the magnitude θc of the CTA angle is usually larger than the threshold angle θ1*th*, in other words, the CTA candidate is typically present in one of the side areas of the own vehicle SV. Therefore, when the CPU 11 makes a "Yes" determination at Step 827, in other words, when the PedW candidate is present in the front area of the own vehicle SV, the above described (2) is usually established, and the CTA candidate which is present in one of the side areas of the own vehicle SV is determined/designated as the warning object. However, the magnitude θc of the CTA angle may be equal to or smaller than the threshold angle θ1*th* in some cases, in other words, the CTA candidate may be present in the front area of the own vehicle SV, for example, due to the detection error and/or the manufacturing error in the arrangement location and/or the arrangement angle. In this case, the CPU 11 makes a "Yes" determination at Step 878, determines that the above described (3) is established, and determines/designates the PedW candidate which is present in the front area of the own vehicle SV as the warning object.

Meanwhile, when at least one of the PedW candidate and the CTA candidate has not been extracted/selected at the time of executing the process at Step 815 shown in FIG. 8A, the CPU 11 makes a "No" determination at Step 815, and proceeds to Step 884. At Step 884, the CPU 11 determines whether or not the PedW candidate has been extracted/selected but the CTA extracted/selected has not been determined, based on the PedW candidate information obtained at Step 805 and the CTA candidate information obtained at Step 810. More specifically, when the PedW candidate information includes the location information and the time to collision of the PedW candidate, and the CTA candidate information includes information representing that there is no PedW candidate, the CPU 11 determines that the CTA candidate has not been extracted/selected and only the PedW candidate has been extracted/selected.

When the CTA candidate has not been extracted/selected and only the PedW candidate has been extracted/selected, the CPU 11 makes a "Yes" determination at Step 884, and proceeds to Step 825 to determine/designate the PedW candidate as the warning object. Then, the CPU 11 proceeds to the processes after Step 830 so as to display the front warning screen 410 or the side warning screen based on the magnitude θp of the PedW angle.

On the other hand, when only the CTA candidate has been extracted/selected, or when none of the PedW candidate and the CTA candidate has been extracted/selected, the CPU 11 makes a "No" determination at Step 884, and proceeds to Step 886. At Step 886, the CPU 11 determines whether or not "the PedW candidate has not been extracted/selected and only the CTA candidate has been extracted/selected".

When the PedW candidate has not been extracted/selected and only the CTA candidate has been extracted/selected, the CPU 11 makes a "Yes" determination at Step 886, and proceeds to Step 855 to determine/designates the CTA candidate as the warning object. Then, the CPU 11 proceeds to the processes after Step 860 so as to display the front warning screen 410 or the side warning screen based on the magnitude θc of the CTA angle.

On the other hand, when only the CTA candidate has not been extracted/selected, in other word, when none of the PedW candidate and the CTA candidate has been extracted/selected, the CPU 11 does not need to display the warning screen. Therefore, the CPU 11 makes a "No" determination at Step 886, and directly proceeds to Step 895 to tentatively terminate the present routine. As a result, the warning screen is not displayed.

The present invention is not limited to the above-mentioned embodiment, and can adopts various modifications of the present invention. For example, the display unit 60 is not limited to the HUD. The display unit 60 may be a Multi Information Display (MID), a touch panel of the navigation device, or the like. The MID is a display panel which is arranged on a dash board and which includes a speed meter, a taco meter, a fuel gauge, an water temperature gauge, an od/trip meter, an warning lump, and the like.

A function of the PedW candidate selection ECU 40 may be implemented in the image processing device (not shown) of the camera sensor 21, the radar sensor ECU 30, or the warning ECU 10. Furthermore, a function of the CTA candidate selection ECU 50 may be implemented in the radar ECU 30 or the warning ECU 10.

Although the PedW candidate selection ECU 40 selects at least one obstacle from at least one object whose type is detected/determined to be the pedestrian by the camera sensor 21, the PedW candidate selection ECU 40 is not limited to this. For example, the PedW candidate selection ECU 40 may select at least one obstacle from the objects whose type match any one of the pedestrian, a bicycle, and a motorcycle.

Although the predetermined location DP of the own vehicle SV shown in FIG. 3 is set to the center location of the driver's seat of the own vehicle SV in the width direction, the predetermined location DP is not limited to this. The predetermined location DP may be set to an arbitrary location. For example, the predetermined location DP may be set to a center location of the front end of the own vehicle SV in the width direction.

The threshold T1*th* used at Step 640 in the routine represented by the flowchart in FIG. 6 may be different from the threshold T1*th* used at Step 735 in the routine represented by the flowchart in FIG. 7.

In the routine represented by the flowchart in FIGS. 8A and 8B, when the CTA candidate has been determined/designated as the warning object at Step 855, the CPU 11 predicts/presumes that the CTA candidate is present in one of the side areas of the own vehicle SV to proceed to Step 845 so as to display the side warning screen 420 which guides the driver's eyes to the direction of the CTA candidate determined/designated as the warning object, without executing the processes at Step 860 and Step 865. The CTA candidate usually is present in one of the side areas of the own vehicle, and possibility that the CTA candidate is present in the front area of the own vehicle SV is low. Therefore, the CPU 11 predicts/presumes that the CTA candidate is present in one of the side areas of the own vehicle SV. According to this modification, the CPU 11 does not need to execute the processes at Step 860 and Step 865 to determine whether the CTA candidate is present in one of the side areas of the own vehicle SV or in the front area of the own vehicle SV. This can decrease a processing load of the CPU 11.

Furthermore, in the routine represented by the flowchart in FIGS. 8A and 8B, when the CPU 11 makes a "Yes" determination at Step 872 shown in FIG. 8B, in other words, when the PedW candidate is present in the front area of the own vehicle SV, the CPU 11 predicts/presumes that the CTA candidate is present in one of the side areas of the own vehicle so as to proceed to Step 880, without executing the processes at Step 876 and Step 878. At Step 880, the CPU 11 determines/designates the CTA candidate as the warning object, and proceeds to Step 845 so as to display the side warning screen 420 which guides the driver's eyes to the direction of the CTA candidate determined/designated as the warning object. This can decrease the processing load of the CPU 11.

In other words, when the PedW_TTC is equal to the CTA_TTC and the PedW candidate is present in the front area of the own vehicle SV, the CPU 11 predicts/presumes that the CTA candidate is present in one of the side areas of the own vehicle SV and that the above described (2) is established, and determines/designates the CTA candidate as the warning object.

What is claimed is:

1. A warning device for displaying a warning screen for guiding a driver's eyes to a direction of an obstacle which has high probability of colliding with an own vehicle so as to warn the driver of the obstacle, and the warning device comprising an electric control unit comprising a CPU and memories, the electric control unit is configured to:
   detect at least one first object which is present either in a front area of the own vehicle or in a side area of the own vehicle and for identifying a type of the at least one first object;
   detect at least one second object which is present in the side area without identifying the type of the at least one second object;
   select at least one type-identified object whose type is identified to be a predetermined type among the detected at least one first object;
   select, as at least one first obstacle, at least one object which has high probability of colliding with the own vehicle among the selected at least one type-identified object;
   calculate a collision time period for each of the at least one first obstacle to collide with the own vehicle; and
   select, as a first candidate, the obstacle whose collision time period is equal to or shorter than a predetermined threshold time period and is the shortest, among the at least one first obstacle,
   select, as at least one second obstacle, at least one object which has high probability of colliding with the own vehicle among the detected at least one second object;
   calculate the a collision time period for each of the at least one second obstacle to collide with the own vehicle; and
   select, as a second candidate, the obstacle whose collision time period is equal to or shorter than the threshold time period and is the shortest, among the at least one second obstacle,
   display the warning screen; and
   determine, as a warning object, one candidate with the shortest collision time period from the first candidate and the second candidate, and for displaying the warning screen which guides the driver's eyes to a direction of the warning object, when the first candidate and the second candidate have selected,
   wherein the electric control unit is further configured to:
   determine that the first candidate is present in the front area of the own vehicle, when the first candidate has been determined as the warning object and a magnitude of a first angle at a predetermined location of the own vehicle is equal to or smaller than the threshold angle, the first angle being formed between a line which passes through a location of the first candidate and the predetermined location and a base line which passes through the predetermined location and is parallel with a longitudinal direction of the own vehicle to display the warning screen which guides the driver's eyes to a direction of the first candidate using a first display element which guides the driver's eyes to the warning object which is present in the front area of the own vehicle; and determine that the first candidate is present in the side area of the own vehicle, when the first candidate has been determined as the warning object and the magnitude of the first angle is larger than the threshold angle to display the warning screen which guides the driver's eyes to the direction of the first candidate using a second display element which guides the driver's eyes to the warning object which is present in the side area of the own vehicle and whose shape is different from a shape of the first display element, and wherein the warning device further comprises a radar sensor which radiates a radio wave to a sector area which has a center axis extending along a diagonally forward direction of the own vehicle to detect the at least one second object which is present in the side area of the own vehicle using a reflected wave of the radiated radio wave, the electric control unit is further configured to:

determine that the first candidate is present in the side area of the own vehicle to determine the first candidate as the warning object, when the collision time period of the first candidate is equal to the collision time period of the second candidate and the magnitude of the first angle is larger than the threshold angle, to display the warning screen which guides the driver's eyes to the direction of the first candidate using the second display element;

determine that the first candidate is present in the front area of the own vehicle and that the second candidate is present in the side area of the own vehicle to determine the second candidate as the warning object, when the collision time period of the first candidate is equal to the collision time period of the second candidate, the magnitude of the first angle is equal to or smaller than the threshold angle, and a magnitude of a second angle at the predetermined location is larger than the threshold angle, the second angle being formed between a line which passes through a location of the second candidate and the predetermined location and the base line, to display the warning screen which guides the driver's eyes to a direction of the second candidate using the second display element; and determine that both of the first candidate and the second candidate are present in the front area of the own vehicle to determine the first candidate as the warning object, when the collision time period of the first candidate is equal to the collision time period of the second candidate, and both of the magnitude of the first angle and the magnitude of the second angle are equal to or smaller than the threshold angle, and to display the warning screen which guides the driver's eyes to the direction of the first candidate using the first display element.

2. The warning device according to claim 1, wherein the electric control unit is further configured to:

determine that the second candidate is present in the front area of the own vehicle, when the second candidate has been determined as the warning object and the magnitude of the second angle at the predetermined location is equal to or smaller than the threshold angle, the second angle being formed between a line which passes through a location of the second candidate and the predetermined location and the base line to display the warning screen which guides the driver's eyes to the direction of the second candidate using the first display element; and determine that the second candidate is present in the side area of the own vehicle, when the magnitude of the second angle is larger than the threshold angle to display the warning screen which guides the driver's eyes to the direction of the second candidate using the second display element.

3. The warning device according to claim 1, wherein the electric control unit is further configured to:

presume that the second candidate is present in the side area of the own vehicle, when the second candidate is determined as the warning object; and display the warning screen which guides the driver's eyes to the direction of the second candidate using the second display element.

4. The warning device according to claim 1, wherein the electric control unit is further configured to:

determine that the first candidate is present in the side area of the own vehicle to determine the first candidate as the warning object obstacle, when the collision time period of the first candidate is equal to the collision time period of the second candidate and the magnitude of the first angle is larger than the threshold angle, to display the warning screen which guides the driver's eyes to the direction of the first candidate using the second display element; and determine that the first candidate is present in the front area of the own vehicle and presume that the second candidate is present in the side area of the own vehicle to determine the second candidate as the warning object, when the collision time period of the first candidate is equal to the collision time period of the second candidate and the magnitude of the first angle is equal to or smaller than the threshold angle, to display the warning screen which guides the driver's eyes to the direction of the second candidate using the second display element.

5. The warning device according to claim 1, wherein the warning device further comprises:

a camera sensor which photographs the front area and the side area of the own vehicle, detects the at least one first object which is present either in the front area or in the side area based on a photographed image, and identifies the type of each of the at least one first object based on the photographed image; and a front radar sensor which radiates a first radio wave to the front area of the own vehicle and a second radio wave to the side area of the own vehicle to detect the at least one first object which is present either in the front area or in the side area, and the electric control unit is further configured to select the at least one first object whose type is identified, to be any one of a pedestrian, a bicycle, and a motorcycle.

6. A warning device for displaying a warning screen which guides a driver's eyes to a direction of an object which is present either in a front area or in a side area of an own vehicle in order to warn the driver to the object, and the warning device comprising an electric control unit comprising a CPU and memories, the electric control unit is configured to:

detect at least one first object which is present either in the front area or in the side area, and for identifying a type of each of the at least one first object;

detect at least one second object which is present in the side area without identifying the type of each of the at least one second object;

display the warning screen; and display the warning screen which guides the driver's eyes to a single direction of the object whose collision time period which it takes for the object to collide with the own vehicle is the shortest among the detected at least one first object and the detected at least one second object, wherein the electric control unit is further configured to:
determine that the first candidate is present in the front area of the own vehicle, when the first candidate has been determined as the warning object and a magnitude of a first angle at a predetermined location of the own vehicle is equal to or smaller than a predetermined threshold angle, the first angle being formed between a line which passes through a location of the first candidate and the predetermined location and a base line which passes through the predetermined location and is parallel with a longitudinal direction of the own vehicle to display the warning screen which guides the driver's eyes to the direction of the first candidate using a first display element which guides the driver's eyes to the warning object which is present in the front area of the own vehicle; and determine that the first candidate is present in the side area of the own vehicle, when the first candidate has been determined as the warning object and the magnitude of the first angle is larger than the threshold angle to display the warning screen which guides the driver's eyes to the direction of the first candidate using a second display element which guides the driver's eyes to the warning object which is present in the side area of the own vehicle and whose shape is different from a shape of the first display element, and wherein the warning device further comprises a radar sensor which radiates a radio wave to a sector area which has a center axis extending along a diagonally forward direction of the own vehicle to detect the at least one second object which is present in the side area of the own vehicle using a reflected wave of the radiated radio wave, the electric control unit is further configured to:

determine that the first candidate is present in the side area of the own vehicle to determine the first candidate as the warning object, when the collision time period of the first candidate is equal to the collision time period of the second candidate and the magnitude of the first angle is larger than the threshold angle, to display the warning screen which guides the driver's eyes to the direction of the first candidate using the second display element;

determine that the first candidate is present in the front area of the own vehicle and that the second candidate is present in the side area of the own vehicle to determine the second candidate as the warning object, when the collision time period of the first candidate is equal to the collision time period of the second candidate, the magnitude of the first angle is equal to or smaller than the threshold angle, and a magnitude of a second angle at the predetermined location is larger than the threshold angle, the second angle being formed between a line which passes through a location of the second candidate and the predetermined location and the base line, to display the warning screen which guides the driver's eyes to a direction of the second candidate using the second display element; and determine that both of the first candidate and the second candidate are present in the front area of the own vehicle to determine the first candidate as the warning object, when the collision time period of the first candidate is equal to the collision time period of the second candidate, and both of the magnitude of the first angle and the magnitude of the second angle are equal to or smaller than the threshold angle, and to display the warning screen which guides the driver's eyes to the direction of the first candidate using the first display element.

* * * * *